(12) United States Patent
Lin et al.

(10) Patent No.: US 9,813,706 B1
(45) Date of Patent: Nov. 7, 2017

(54) VIDEO CONTENT ANALYSIS AND/OR PROCESSING USING ENCODING LOGS

(71) Applicant: Google Inc., Mountain View, CA (US)

(72) Inventors: Yao-Chung Lin, Sunnyvale, CA (US); Sam John, Fremont, CA (US); Thierry Foucu, San Jose, CA (US); Sasi Inguva, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 163 days.

(21) Appl. No.: 14/093,939

(22) Filed: Dec. 2, 2013

(51) Int. Cl.
| | |
|---|---|
| *H04N 7/12* | (2006.01) |
| *H04N 11/04* | (2006.01) |
| *H04N 11/02* | (2006.01) |
| *H04N 7/32* | (2006.01) |
| *H04N 7/26* | (2006.01) |
| *H04N 19/87* | (2014.01) |
| *H04N 19/40* | (2014.01) |
| *H04N 19/51* | (2014.01) |

(52) U.S. Cl.
CPC . *H04N 19/00921* (2013.01); *H04N 19/00472* (2013.01); *H04N 19/00587* (2013.01)

(58) Field of Classification Search
CPC ....... H04N 19/00921; H04N 19/00472; H04N 19/00587
USPC .................................................... 375/240.16
See application file for complete search history.

(56) References Cited

U.S. PATENT DOCUMENTS

| | | | | |
|---|---|---|---|---|
| 5,650,860 A | * | 7/1997 | Uz | ....................... H04N 19/176 |
| | | | | 375/240.24 |
| 5,767,922 A | * | 6/1998 | Zabih | ..................... H04N 5/147 |
| | | | | 348/699 |
| 6,795,506 B1 | * | 9/2004 | Zhang | ................. H04L 12/5693 |
| | | | | 348/390.1 |
| 6,940,910 B2 | * | 9/2005 | Jun | ..................... G06K 9/00765 |
| | | | | 348/E5.067 |
| 7,068,722 B2 | | 6/2006 | Wells | |
| 7,110,454 B1 | | 9/2006 | Chakraborty | |
| 8,270,483 B1 | | 9/2012 | Zhang et al. | |

(Continued)

OTHER PUBLICATIONS

Ueda, H., et al, "Impact: An Interactive Natural-Motion-Picture Dedicated Multimedia Authoring System," 1991, pp. 343-350, Central Research Laboratory, Hitachi, Ltd., Tokyo, Japan.

(Continued)

*Primary Examiner* — Hee-Yong Kim
(74) *Attorney, Agent, or Firm* — Young Basile Hanlon & MacFarlane, P.C.

(57) ABSTRACT

A system to facilitate analyzing and/or processing video content using encoding logs is provided. The system includes a first analysis component, a second analysis component and a transcoding component. The first analysis component determines a first set of shot-change locations associated with a cut transition in a video sequence based on an encoding log associated with at least one previously encoded video frame. The second analysis component determines a second set of shot-change locations associated with a fading transition in the video sequence based on the encoding log associated with the at least one previously encoded video frame. The transcoding component processes the video sequence based on at least a portion of the first set of shot-change locations and the second set of shot-change locations.

16 Claims, 16 Drawing Sheets

(56) References Cited

U.S. PATENT DOCUMENTS

| | | | | |
|---|---|---|---|---|
| 2003/0215014 A1* | 11/2003 | Koto | ................... | H04N 19/105 375/240.16 |
| 2006/0239348 A1* | 10/2006 | Zhang | ................... | H04N 19/56 375/240.12 |
| 2006/0271947 A1 | 11/2006 | Lienhart et al. | | |
| 2009/0086814 A1* | 4/2009 | Leontaris | ............ | H04N 19/105 375/240.02 |
| 2013/0028316 A1* | 1/2013 | Leontaris | ............ | H04N 19/597 375/240.03 |
| 2013/0279563 A1 | 10/2013 | Li et al. | | |

OTHER PUBLICATIONS

Gargi, U., et al., "Performance Characterization of Video-Shot-Change Detection Methods," IEEE Transactions on Circuits and Systems for Video Technology, Feb. 2000, 13 pages, vol. 10, No. 1.
Wikipedia, "Coefficient of determination," Nov. 6, 2013, 8 Pages, Can be retrieved at <URL:https://en.wikipedia.org/w/index.php?title=Coefficient_of_determination&oldid=580434155>.

* cited by examiner

VIDEO CONTENT ANALYSIS AND/OR PROCESSING USING ENCODING LOGS

TECHNICAL FIELD

This disclosure relates to system(s) and method(s) for analyzing and/or processing video content using encoding logs.

BACKGROUND

Often times it is desirable to detect changes between video frames in a video sequence. For example, shot-change detection can be implemented to detect changes in video scenes of a video sequence (e.g., to determine a sequence of video frames that are related). In one example, shot-change information can be employed to facilitate distributed transcoding (e.g., splitting a video sequence into chunks of video content and transcoding the chunks of video content in parallel) since it is often times advantageous to split a video sequence for distributed transcoding at shot-change boundaries. However, conventional shot-change detection techniques are computationally demanding. For example, conventional shot-change detection techniques process a video sequence by decoding the video sequence and/or scanning all pixel data in the video sequence. Furthermore, conventional shot-change detection techniques often times compute a pixel luminance histogram for each video frame in the video sequence.

SUMMARY

The following presents a simplified summary of the specification in order to provide a basic understanding of some aspects of the specification. This summary is not an extensive overview of the specification. It is intended to neither identify key or critical elements of the specification, nor delineate any scope of the particular implementations of the specification or any scope of the claims. Its sole purpose is to present some concepts of the specification in a simplified form as a prelude to the more detailed description that is presented later.

In accordance with an implementation, a system includes a first analysis component, a second analysis component and a transcoding component. The first analysis component determines a first set of shot-change locations associated with a cut transition in a video sequence based on an encoding log associated with at least one previously encoded video frame. The second analysis component determines a second set of shot-change locations associated with a fading transition in the video sequence based on the encoding log associated with the at least one previously encoded video frame. The transcoding component processes the video sequence based on at least a portion of the first set of shot-change locations and the second set of shot-change locations.

In accordance with another implementation, a method provides for receiving an encoding log associated with an encoded video sequence, determining a first set of shot-change locations associated with a cut transition in the encoded video sequence based on statistical data included in the encoding log, determining a second set of shot-change locations associated with a fading transition in the encoded video sequence based on the statistical data included in the encoding log, and transmitting at least a portion of the first set of shot-change locations and the second set of shot-change locations to facilitate re-encoding of the encoded video sequence.

In accordance with yet another implementation, a system includes a transcoding component and a content analyzer component. The transcoding component generates an encoded video sequence and at least one encoding log associated with the encoded video sequence. The content analyzer component determines a first set of shot-change locations associated with a cut transition and a second set of shot-change locations associated with a fading transition based on the at least one encoding log associated with the encoded video sequence.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, implementations, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
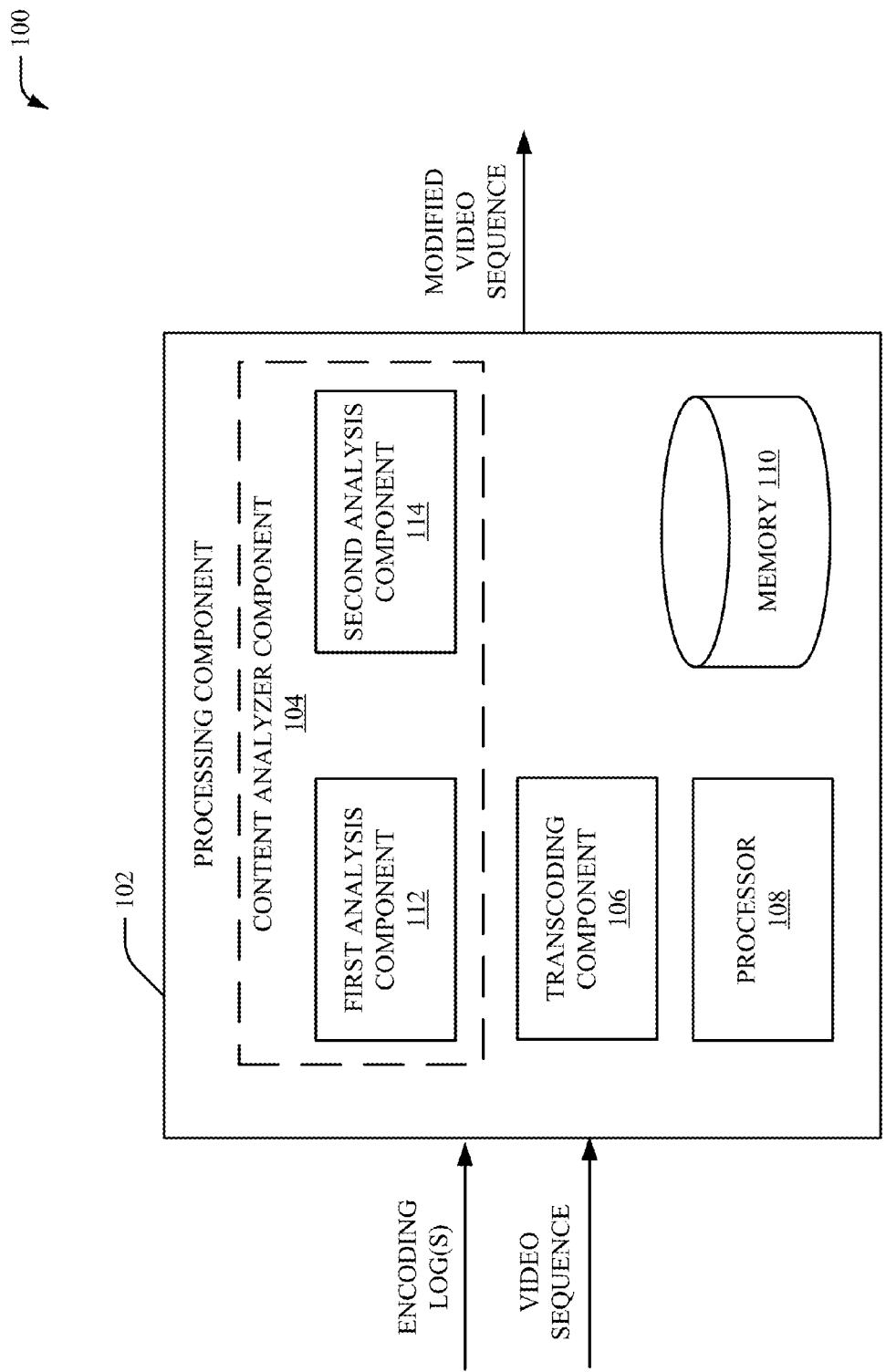
FIG. 1 illustrates a high-level block diagram of an example system for analyzing and/or processing video content using at least one encoding log, in accordance with various aspects and implementations described herein.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

Often times it is desirable to detect changes between video frames in a video sequence. For example, shot-change detection can be implemented to detect changes in video scenes of a video sequence (e.g., to determine a sequence of video frames that are related). In one example, shot-change information can be employed to facilitate distributed transcoding (e.g., splitting a video sequence into chunks of video content and transcoding the chunks of video content in parallel) since it is often times advantageous to split a video sequence for distributed transcoding at shot-change boundaries. However, conventional shot-change detection techniques are computationally demanding. For example, conventional shot-change detection techniques process a video sequence by decoding the video sequence and/or scanning all pixel data in the video sequence. Furthermore, conventional shot-change detection techniques often times compute a pixel luminance histogram for each video frame in the video sequence.

To that end, techniques for analyzing and/or processing video content based on encoding logs are disclosed. For example, at least one shot-change location associated with a video sequence can be detected based on at least one encoding log associated with previously encoded data (e.g., at least one previously encoded video frame, a previously encoded video sequence, a video sequence generated via a first transcoding process, etc.). In an aspect, at least one shot-change location associated with a video sequence can be detected via a video content analyzer. For example, a video content analyzer can detect at least one shot-change location based on at least one encoding log without employing (e.g., receiving, scanning, processing, decoding, etc.) the video sequence. Accordingly, at least one shot-change location associated with a video sequence can be determined without accessing (e.g., processing) pixel data related to video frames in the video sequence and/or without accessing (e.g., processing) a bitstream associated with the video sequence.

In an aspect, statistical data included in at least one encoding log can be utilized for shot-change detection. For example, variance data (e.g., sum of block variance (var) data) and/or motion compensated variance data (e.g., sum of motion compensated block variance (mc_var) data) included in at least one encoding log can be utilized for shot-change detection. In an aspect, variance data (e.g., var data) can be sum of block variance data associated with video frames in a video sequence (e.g., an encoded video sequence). In another aspect, motion compensated variance data (e.g., mc_var data) can be sum of motion compensated block variance associated with residual frames related to a video sequence (e.g., an encoded video sequence). In one example, variance data and/or motion compensated variance data can be utilized to detect regular shot cut transitions, fading-in transitions and/or fading-out transitions. As such, changes in the statistical data that is included in the at least one encoding log (e.g., changes in the variance data and/or the motion compensated variance data) can facilitate detection of shot changes (e.g., patterns in the statistical data included in the at least one encoding log can be utilized to identify possible shot-change locations). In one example, a discontinuity (e.g., sudden change) in the statistical data included in the at least one encoding log can correspond to a possible shot-change (e.g., a potential cut transition). In another example, a ramp (e.g., a gradual change) in the statistical data included in the at least one encoding log can correspond to a different possible shot-change (e.g., a potential fading transition). In another aspect, an impulse detector, a step detector and/or a ramp detector can be implemented to analyze statistical data (e.g., variance data and/or motion compensated variance data) included in at least one encoding log. Accordingly, cost of determining shot-change locations associated with a video sequence can be reduced. Furthermore, encoding quality and/or transcoding quality of a video sequence can be improved.

Referring initially to FIG. 1, there is illustrated an example system 100 for analyzing and/or processing video content based on encoding logs, according to an aspect of the subject disclosure. In an aspect, the system 100 can be implemented on or in connection with one or more servers (e.g., one or more servers that host user-uploaded media content, one or more servers associated with streaming media content, etc.). For example, the system 100 can be employed by various systems, such as, but not limited to media content systems, media server systems, cloud-based systems, content management systems, network systems, computer network systems, communication systems, router systems, server systems, high availability server systems (e.g., Telecom server systems), Web server systems, file server systems, disk array systems, powered insertion board systems, and the like. In another aspect, the system 100 can be implemented on or in connection with a device (e.g., a user device). For example, the device (e.g., the user device) can include, but is not limited to, a cellular phone (e.g., a smart phone), a tablet, a camera, a personal computer (PC), a desktop computer, a laptop computer, a personal digital assistant (PDA), an electronic reader (e-reader), a media capable device, a portable computing device, an interactive television, an internet-connected television, a set-top box, a streaming media device, a gaming device, etc.

Specifically, the system 100 can provide a processing component with a content analyzer feature (e.g., content analyzer component 104) and a transcoding feature (e.g., transcoding component 106) that can be utilized in, for example, a media content application (e.g., a video application). In an aspect, the content analyzer feature can include a first analysis feature (e.g., first analysis component 112) and a second analysis feature (e.g., second analysis component 114). The first analysis feature can determine a first set of shot-change locations associated with a cut transition in a video sequence based on an encoding log associated with at least one previously encoded video frame. The second analysis feature can determine a second set of shot-change locations associated with a fading transition in the video sequence based on the encoding log associated with the at least one previously encoded video frame. The transcoding feature can process the video sequence based on at least a portion of the first set of shot-change locations and the second set of shot-change locations.

In particular, the system 100 can include a processing component 102 that includes a content analyzer component 104 and/or a transcoding component 106. In an aspect, the content analyzer component 104 can be implemented on the processing component 102. In another aspect, the content analyzer component 104 can be implemented separate from the processing component 102 and/or the transcoding component 106. The content analyzer component 104 can include a first analysis component 112 and a second analysis component 114. Aspects of the systems, apparatuses or processes explained in this disclosure can constitute machine-executable component(s) embodied within machine(s), e.g., embodied in one or more computer readable mediums (or media) associated with one or more machines. Such component, when executed by the one or more machines, e.g., computer(s), computing device(s), virtual machine(s), etc. can cause the machine(s) to perform the operations described. System 100 can include memory 110 for storing computer executable components and instructions. System 100 can further include a processor 108 to facilitate operation of the instructions (e.g., computer executable components and instructions) by system 100.

The processing component 102 (e.g., the content analyzer component 104) can receive at least one encoding log (e.g., ENCODING LOG(S) shown in FIG. 1). Additionally, the processing component 102 (e.g., the transcoding component 106) can receive a video sequence (e.g., VIDEO SEQUENCE shown in FIG. 1). In an aspect, the video sequence can be an encoded video sequence (e.g., a previously encoded video sequence, a compressed video sequence, etc.). For example, the video sequence and/or the at least one encoding log can be generated by a first transcoding process (e.g., a first transcoding component). In one example, the video sequence can be in a mezzanine format. However, it is to be appreciated that the video sequence can be in any recognizable and suitable media file format (e.g., video file format, codec compression format, video encoding format, transcoding format, etc.). The at least one encoding log can be associated with the video sequence. As such, the at least one encoding log can be associated with at least one previously encoded video frame (e.g., a previously encoded video sequence, a video sequence generated via a first transcoding process, etc.). In an aspect, the at least one encoding log can be associated with a video compression standard. In a non-limiting example, the at least one encoding log can be implemented as at least one H.263 log. However, it is to be appreciated that the at least one encoding log can be associated with a different type of video compression standard (e.g., H.264, VP8, MPEG-4 Visual, AVC, etc.). In another non-limiting example, the at least one encoding log can be implemented as at least one universal encoding log. In yet another non-limiting example, the at least one encoding log can be implemented as at least one pass log (e.g., ffmpeg pass log).

The at least one encoding log can include statistical data associated with the video sequence. The statistical data included in the at least one encoding log can be utilized for shot-change detection. In an aspect, the at least one encoding log can include variance data (e.g., sum of block variance (var) data). For example, example, the variance data (e.g., var data) can be pixel variance information for video frames associated with the video sequence. In an example, the video sequence can be represented by a set of video frames (e.g., a set of image frames). A video frame from the set of video frames can be divided into sets of individual image pixel values arranged in blocks or matrices, for example, as a set of blocks (e.g., a set of macroblocks). Pixel variance can be determined (e.g., calculated) for each of the macroblocks in a video frame from the video sequence. Furthermore, a sum of macroblock variance can be determined (e.g., calculated) for each video frame in the video sequence. As such, the variance data (e.g., var data) can correspond to sum of macroblock variance for each video frame in the video sequence. For example, first variance data from the variance data can be associated with sum of macroblock variance for a first video frame in the video sequence, second variance data from the variance data can be associated with sum of macroblock variance for a second video frame in the video sequence, etc.

Additionally or alternatively, the at least one encoding log can include motion compensated variance data (e.g., sum of motion compensated block variance (mc_var) data). In an aspect, the motion compensated variance data can be residual variance data. For example, the motion compensated variance data (e.g., mc_var data) can be motion compensated pixel variance information for residual frames associated with the video sequence. In an example, consecutive video frames in the video sequence can comprise similar content at different locations within the video frames. Therefore, the video sequence can be associated with predicted data that takes advantage of content similarities between consecutive video frames (e.g., to more efficiently encode a video frame). In an example, the video sequence can be generated as a function of one or more reference frames (e.g., predicted frames). The one or more reference frames (e.g., predicted frames) can be generated via motion estimation and/or motion compensation. For example, an encoder (e.g., a transcoder) employed to generate the video sequence can utilize at least a portion of a reconstructed previous video frame as a reference frame (e.g., predicted frame) when encoding a current video frame. Furthermore, the encoder (e.g., the transcoder) can then subtract the reference frame (e.g., the predicted frame) from the current video frame to form a residual frame.

As such, the video sequence can be associated with a set of residual frames. A residual frame from the set of residual frames can be divided into sets of individual image pixels values arranged in blocks or matrices, for example, as a set of blocks (e.g., a set of macroblocks). Pixel variance can be determined (e.g., calculated) for each of the macroblocks in a residual frame. Furthermore, a sum of macroblock variance can be determined (e.g., calculated) for each video frame in the video sequence. As such, the motion compensated variance data (e.g., mc_var data) can correspond to sum of macroblock variance for each residual frame associated with the video sequence. For example, first motion compensated variance data from the variance data can be associated with sum of macroblock variance for a first residual frame associated with the video sequence, second motion compensated variance data from the variance data can be associated with sum of macroblock variance for a second residual frame associated with the video sequence, etc.

The first analysis component 112 can determine a first set of shot-change locations associated with a cut transition (e.g., a sudden change) in the video sequence based on the at least one encoding log (e.g., the at least one encoding log associated with at least one previously encoded video frame). In one example, the first analysis component 112 can detect at least one data sample associated with a discontinuity in the variance data (e.g., var data) and/or the motion compensated variance data (e.g., mc_var data). In an aspect, a first matrix array can be associated with the variance data (e.g., var data) and/or a second matrix array can be associated with the motion compensated variance data (e.g., mc_var data).

The first analysis component 112 can employ one or more heuristic detectors to analyze the statistical data associated with the video sequence (e.g., to determine a first set of shot-change locations associated with a cut transition). In an aspect, the first analysis component 112 can employ an impulse detector to analyze the statistical data associated with the video sequence (e.g., to determine a first set of shot-change locations associated with a cut transition). For example, the first analysis component 112 can employ an impulse detector to analyze the variance data (e.g., var data) and/or the motion compensated variance data (e.g., mc_var data). In an example, an impulse can be a data sample (e.g., a data sample location, a frame number, etc.) associated with variance data (e.g., var data) and/or motion compensated variance data (e.g., mc_var data) which comprises a value that is greater than a local average of data associated with other variance data (e.g., var data) and/or other motion compensated variance data (e.g., mc_var data). For example, consider a particular sample mc_var at a frame f, and a window W of neighboring samples with respect to the frame f. In an aspect, the average of statistical data (e.g., mc_var data, var data, etc.) within W and excluding f can be computed and denoted as avg_W(f). As such, if a ratio mc_var(f)/avg_W(f) is greater than a certain threshold value, it can be determined that frame f is associated with an impulse. In another aspect, a median of statistical data (e.g., mc_var data, var data, etc.) within W and excluding f can be computed and denoted as median_W(f). As such, if a ratio mc_var(f)/median_W(f) is greater than a certain threshold value, it can be determined that frame f is associated with an impulse. Accordingly, the first analysis component 112 can detect an impulse pattern in the variance data (e.g., var data) and/or the motion compensated variance data (e.g., mc_var data).

Additionally or alternatively, the first analysis component 112 can employ a step detector to analyze the statistical data associated with the video sequence (e.g., to determine a first set of shot-change locations associated with a cut transition). For example, the first analysis component 112 can employ a step detector to analyze the variance data (e.g., var data) and/or the motion compensated variance data (e.g., mc_var data). As such, the first analysis component 112 can detect a step pattern in the variance data (e.g., var data) and/or the motion compensated variance data (e.g., mc_var data). In an example, a data sample associated with a frame f can be associated with a step pattern in response to a determination that a first difference (e.g., a difference between the data sample associated with the frame f and a previous sample associated with a frame f−1) is greater than a second difference (e.g., a difference between the data sample associated with the frame f and a next sample associated with a frame f+1) and a third difference (e.g., a difference between the previous sample associated with frame f−1 and another previous sample associated with a frame f−2). As such, the first analysis component 112 can additionally or alternatively detect a step pattern in the variance data (e.g., var data) and/or the motion compensated variance data (e.g., mc_var data).

The second analysis component 114 can determine a second set of shot-change locations associated with a fading transition (e.g., a gradual change) in the video sequence based on the at least one encoding log (e.g., the at least one encoding log associated with at least one previously encoded video frame). In one example, the second analysis component 114 can detect at least one data sample associated with a gradual change in the variance data (e.g., var data). In an aspect, the second analysis component 114 can employ a ramp detector to analyze the statistical data associated with the video sequence (e.g., to determine a second set of shot-change locations associated with a fading transition). For example, the second analysis component 114 can employ a ramp detector to analyze the variance data (e.g., var data). In one example, the second analysis component 114 can employ a ramp detector to analyze a square root of the variance data (e.g., sqrt(var data)).

In an aspect, the second analysis component 114 can determine a second set of shot-change locations associated with a fading transition based on a linear fitting of the statistical data (e.g., the variance data). In an example, the second analysis component 114 can detect whether a sequence of statistical data within a window (e.g., a sliding window) is increasing and/or decreasing. Furthermore, the second analysis component 114 can analyze the statistical data based at least in part on linear regression. Additionally, the second analysis component 114 can calculate a slope value and/or a coefficient of determination value associated with statistical data within the window (e.g., the sliding window). As such, the second analysis component 114 can determine a second set of shot-change locations based at least in part on a rate of change and/or a level of variance associated with the statistical data (e.g., the variance data). In an aspect, the second analysis component 114 can associate statistical data within the window (e.g., the sliding window) with a ramp pattern in response to a determination that the slope value is greater than a certain slope threshold value and/or that the coefficient of determination value is greater than a certain coefficient of determination threshold value. As such, the second analysis component 114 can detect a ramp pattern in the variance data (e.g., var data).

The transcoding component 106 can process the video sequence based on at least a portion of the first set of shot-change locations and the second set of shot-change locations. In an aspect, the transcoding component 106 can generate a modified video sequence (e.g., MODIFIED VIDEO SEQUENCE shown in FIG. 1) based on at least a portion of the first set of shot-change locations and the second set of shot-change locations. For example, the transcoding component 106 can re-encode (e.g., transcode) the video sequence based on at least a portion of the first set of shot-change locations and the second set of shot-change locations. In an aspect, the modified video sequence can be associated with a target format (e.g., a finalized format). In another aspect, the modified video sequence can be associated with streaming video content. In one example, the transcoding component 106 can implement distributed transcoding based on at least a portion of the first set of shot-change locations and the second set of shot-change locations (e.g., the transcoding component 106 can partition the video sequence based on at least a portion of the first set of shot-change locations and the second set of shot-change locations). In yet another aspect, the transcoding component 106 can generate and/or modify one or more transcoding parameters based on at least a portion of the first set of shot-change locations and the second set of shot-change locations.

While FIG. 1 depicts separate components in system 100, it is to be appreciated that the components may be implemented in a common component. For example, the first analysis component 112 and the second analysis component 114 can be included in a single component, the content analyzer component 104 and the transcoding component 106 can be included in a single component, etc. Further, it can be appreciated that the design of system 100 can include other component selections, component placements, etc., to facilitate decryption of media content.

Figure 2:
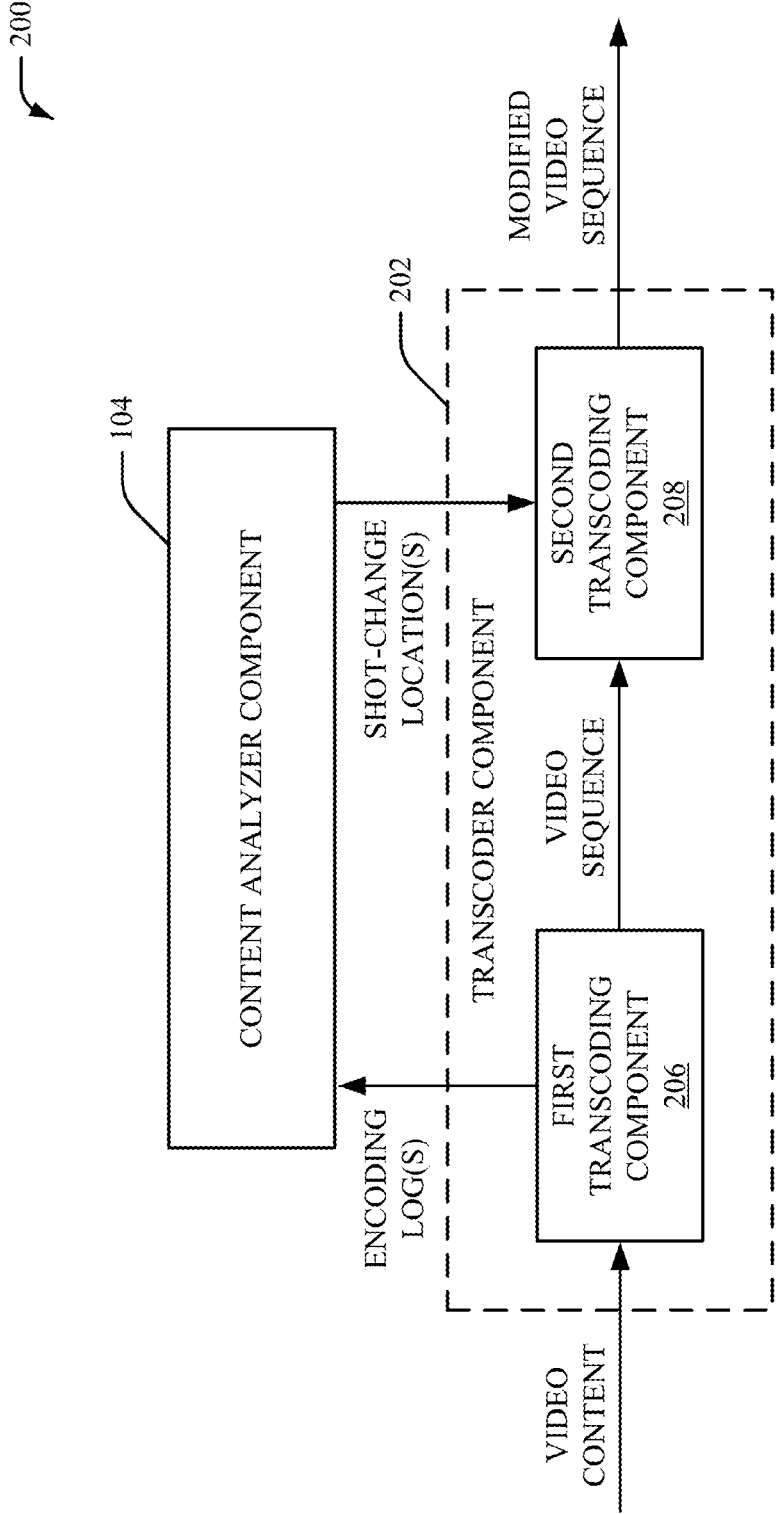
FIG. 2 illustrates a high-level block diagram of another example system for analyzing and/or processing video content using at least one encoding log, in accordance with various aspects and implementations described herein.

Referring now to FIG. 2, there is illustrated a non-limiting implementation of a system 200 in accordance with various aspects and implementations of this disclosure. The system 200 includes a transcoder component 202 and the content analyzer component 104. The transcoder component 202 can include a first transcoding component 206 and a second transcoding component 208. In an aspect, processing component 102 can include the content analyzer component 104 and/or the second transcoding component 208. For example, in an aspect, the second transcoding component 208 can correspond to the transcoding component 106.

The transcoding component 202 (e.g., the first transcoding component 206) can receive video content (e.g., VIDEO CONTENT shown in FIG. 2). In an aspect, the video content can be associated with a container format (e.g., a metadata format). It is to be appreciated that the video content (e.g., video file, video clip, video sample, etc.) can be in any recognizable and/or suitable media file format (e.g., video file format, image file format and/or audio file format), codec compression format, etc. In one example, the video content can be video content uploaded by a user (e.g., a user of a media sharing platform). For example, a user can upload video content via a smart phone, a cell phone, a tablet, a laptop, a desktop computer, a personal digital assistant (PDA), a portable music player, a video game system, an electronic reader (e-reader), global positioning system (GPS), a set-top box, a television, etc.

The first transcoding component 206 can process (e.g., encode, transcode, etc.) the video content via a first transcoding process. For example, the first transcoding component 206 can transcode the video content into a video sequence (e.g., VIDEO SEQUENCE shown in FIG. 2). In an aspect, the first transcoding component 206 can transcode the video sequence into a mezzanine format (e.g., an intermediate format). It is to be appreciated that first transcoding component 206 can transcode the video sequence into any recognizable and/or suitable media file format (e.g., video file format, codec compression format, video encoding format, trancoding format, etc.). Additionally, the first transcoding component 206 can generate at least one encoding log (e.g., ENCODING LOG(S) shown in FIG. 2) associated with the generated video sequence. The at least one encoding log can include at least statistical data (e.g., variance data (e.g., var data) and/or motion compensated variance data (e.g., mc_var data)) associated with the video sequence and/or the first transcoding process employed by the first transcoding component 206.

As such, the content analyzer component 104 (e.g., the first analysis component 112 and/or the second analysis component 114) can receive the at least one encoding log generated by the first transcoding component 206 (e.g., the first transcoding process). The content analyzer component 104 can determine at least one shot-change location (e.g., SHOT-CHANGE LOCATION(S) shown in FIG. 2) based on the at least one encoding log, as more fully disclosed herein. Accordingly, at least one shot-change location associated with the video sequence generated by the first transcoding component 206 can be determined without accessing (e.g., processing) pixel data related to video frames in the video sequence generated by the first transcoding component 206 and/or without accessing (e.g., processing) a bitstream associated with the video sequence generated by the first transcoding component 206.

The second transcoding component 208 can receive the video sequence generated by the first transcoding component 206 (e.g., the first transcoding process). Additionally, the second transcoding component 208 can receive the at least one shot-change location determined by the content analyzer component 104. As such, the second transcoding component 208 can process (e.g., encode, transcode, etc.) the video sequence via a second transcoding process based on the at least one shot-change location. For example, the second transcoding component 208 can transcode the video sequence into a modified video sequence (e.g., MODIFIED VIDEO SEQUENCE shown in FIG. 2) based on the at least one shot-change location determined by the content analyzer component 104. In one example, the second transcoding component 208 can transcode the video sequence into a target format (e.g., a finalized format) for transmission as streaming video content. It is to be appreciated that the second transcoding component 208 can transcode the video sequence into any recognizable and/or suitable media file format (e.g., H.263, H.264, VP8, MPEG-4 Visual, AVC, etc.). Accordingly, encoding quality of the video content and/or the video sequence can be improved. Furthermore, cost of computing the at least one shot-change location can be minimized (e.g., by implementing the content analyzer component 104 in parallel with and/or separate from the transcoder component 202).

Figure 3:
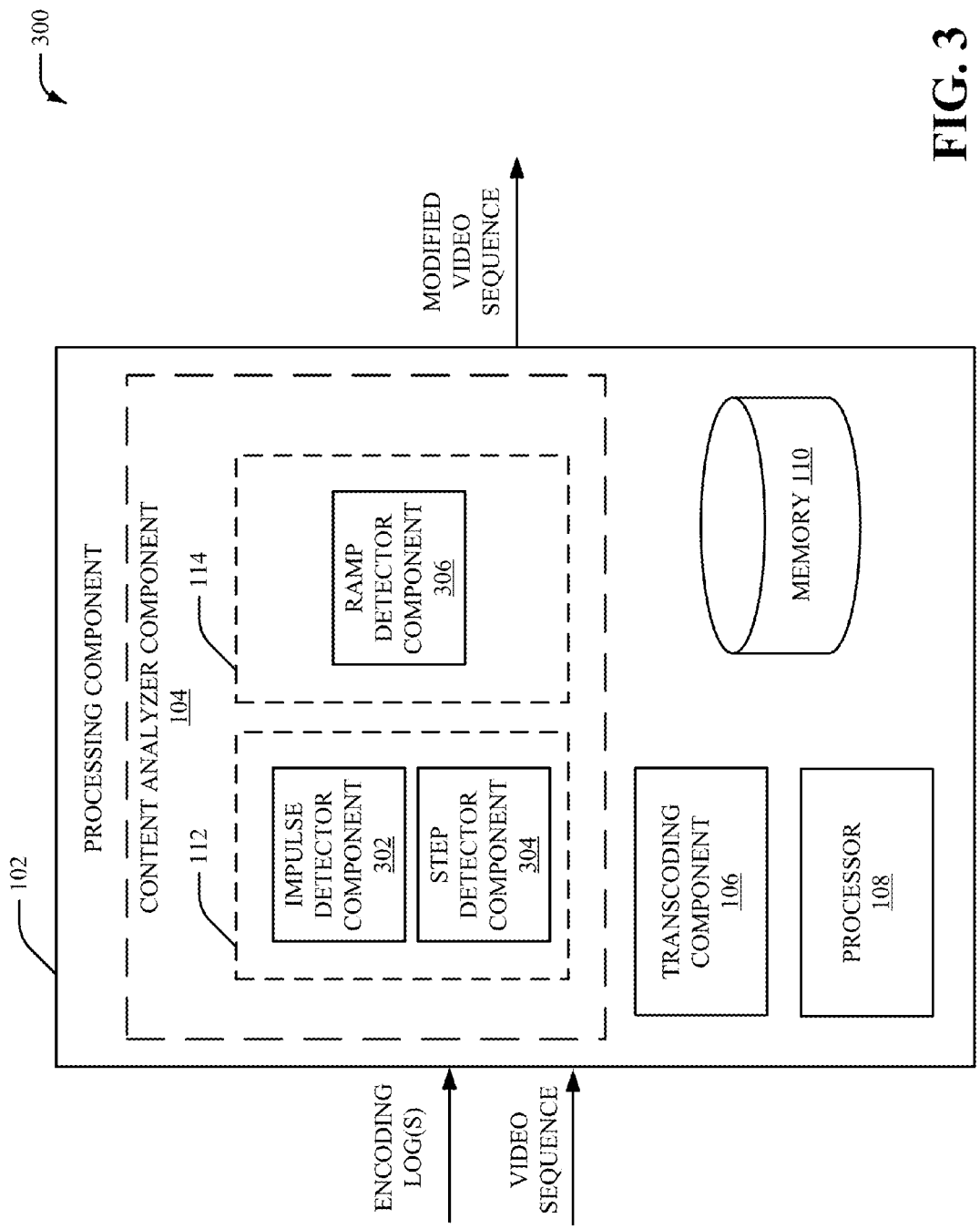
FIG. 3 illustrates a high-level block diagram of yet another example system for analyzing and/or processing video content using at least one encoding log, in accordance with various aspects and implementations described herein.

FIG. 3 illustrates a non-limiting implementation of a system 300 in accordance with various aspects and implementations of this disclosure. The system 300 includes the processing component 102. The processing component 102 includes the content analyzer component 104 and the transcoding component 106. In an aspect, the content analyzer component 104 can be implemented on the processing component 102. In another aspect, the content analyzer component 104 can be implemented separate from the processing component 102 and/or the transcoding component 106. The content analyzer component 104 can include the first analysis component 112 and the second analysis component 114. The first analysis component 112 can include an impulse detector component 302 and a step detector component 304. The second analysis component 114 can include a ramp detector component 306.

The impulse detector component 302 can be configured to detect a video frame (e.g., as statistical data sample associated with a video frame) as a shot-change location associated with a cut transition based on motion compensated variance data (e.g., mc_var data) included in the at least one encoding log. For example, the impulse detector component 302 can be configured to detect an impulse pattern in the motion compensated variance data (e.g., mc_var data) included in the at least one encoding log. Additionally or alternatively, the impulse detector component 302 can be configured to detect a video frame as a shot-change location associated with a cut transition based on variance data (e.g., var data) included in the at least one encoding log. For example, the impulse detector component 302 can be configured to detect an impulse pattern in the variance data (e.g., var data) included in the at least one encoding log.

An impulse pattern can be a data sample (e.g., a data sample location, a frame number in a video sequence, etc.) which comprises a value that is greater than a local average of data associated with the data sample. In an aspect, the impulse detector component 302 can detect an impulse pattern in the motion compensated variance data (e.g., mc_var data) and/or the variance data (e.g., var data) based on a threshold value. For example, if a ratio of a particular motion compensated variance data (e.g., associated with a particular video frame) and a local average of motion compensated variance data (e.g., associated with a plurality of video frames near the particular video frame) is greater than a certain threshold value, it can be determined that the particular motion compensated variance data is associated with an impulse pattern. In another example, if a ratio of a particular variance data (e.g., associated with a particular video frame) and a local average of variance data (e.g., associated with a plurality of video frames near the particular video frame) is greater than a certain threshold value, it can be determined that the particular variance data is associated with an impulse pattern.

The step detector component 304 can additionally or alternatively be configured to detect a video frame (e.g., as statistical data sample associated with a video frame) as a shot-change location associated with a cut transition based on variance data (e.g., var data) included in the at least one encoding log. For example, the step detector component 304 can be configured to detect a step pattern in the variance data (e.g., var data) included in the at least one encoding log. Furthermore, the step detector component 304 can be additionally or alternatively configured to detect a video frame as a shot-change location associated with a cut transition based on motion compensated variance data (e.g., mc_var data) included in the at least one encoding log. For example, the impulse detector component 302 can be configured to detect a step pattern in the motion compensated variance data (e.g., mc_var data) included in the at least one encoding log. In an aspect, the step detector component 304 can be implemented as a four-point step detector. For example, the step detector component 304 can utilize a set of four statistical data samples (e.g., variance data samples and/or motion compensated variance data samples) to detect a step pattern.

A step pattern can be a data sample (e.g., a data sample location, a frame number in a video sequence, etc.) which is associated with a difference value that is greater than difference values associated with at least one previous data sample and at least one next data sample. In an aspect, the step detector component 304 can detect a step pattern in the motion compensated variance data (e.g., var data) and/or the variance data (e.g., mc_var data) based on a threshold value. For example, if a ratio of a difference value associated with a particular variance data (e.g., associated with a particular video frame) and difference values associated with previous variance data and next variance data (e.g., associated with at least one previous data sample and at least one next data sample with respect to the particular video frame) is greater than a certain threshold value, it can be determined that the particular variance data is associated with a step pattern. In another example, if a ratio of a difference value associated with a particular motion compensated variance data (e.g., associated with a particular video frame) and difference values associated with previous motion compensated variance data and next motion compensated variance data (e.g., associated with at least one previous data sample and at least one next data sample with respect to the particular video frame) is greater than a certain threshold value, it can be determined that the particular motion compensated variance data is associated with a step pattern. In an aspect, the impulse detector component 302 can be employed when motion compensated variance data (e.g., var data) is available and the step detector 304 can be employed when motion compensated variance data (e.g., var data) is not available.

The ramp detector component 306 can be configured to detect a video frame (e.g., as statistical data sample associated with a video frame) as a shot-change location associated with a fading transition based on variance data (e.g., var data) included in the at least one encoding log. For example, the ramp detector component 306 can be configured to detect ramp pattern in the variance data (e.g., var data) included in the at least one encoding log. A ramp pattern can be a gradual increase or a gradual decrease of data samples associated with the variance data (e.g., var data). In an aspect, the ramp detector component 306 can detect a ramp pattern in the variance data (e.g., var data) based on a slope threshold value and/or a coefficient of determination threshold value. For example, the ramp detector component 306 can determine a set of data sample values (e.g., a sequence of data sample values) included in the variance data (e.g., var data).

Accordingly, the ramp detector component 306 can determine a slope value associated with the set of data sample values (e.g., the sequence of data sample values) included in the variance data (e.g., var data). Additionally, the ramp detector component 306 can determine a coefficient of determination value associated with the set of data sample values (e.g., the sequence of data sample values) included in the variance data (e.g., var data). As such, when the coefficient of determination value is greater than a certain threshold value (e.g., a coefficient of determination threshold value) and the slope value is greater than another certain threshold value (e.g., a slope threshold value), it can be determined that a ramp pattern is detected in the variance data (e.g., var data). In an aspect, the ramp detector component 306 can detect a ramp pattern (e.g., a fading pattern) based at least in part by determining an absolute value of a slope. Additionally, the ramp detector component 306 can determine a type of ramp (e.g., a fading-in ramp or a fading-out ramp) by determining a sign (e.g., a positive value or a negative value) associated with the slope. For example, a positive slope value can correspond to a ramp pattern that is increasing and a negative slope value can correspond to a ramp pattern that is decreasing.

In another aspect, the ramp detection component 306 can implement a sliding window. For example, the sliding window can incrementally analyze the variance data (e.g., var data) to facilitate detection of a ramp pattern in the variance data (e.g., to facilitate detection of a start location and an end location of one or more potential ramp patterns in the variance data). In yet another aspect, the ramp detector component 306 can analyze a square root of the variance data (e.g., sqrt(var data)).

Figure 4:
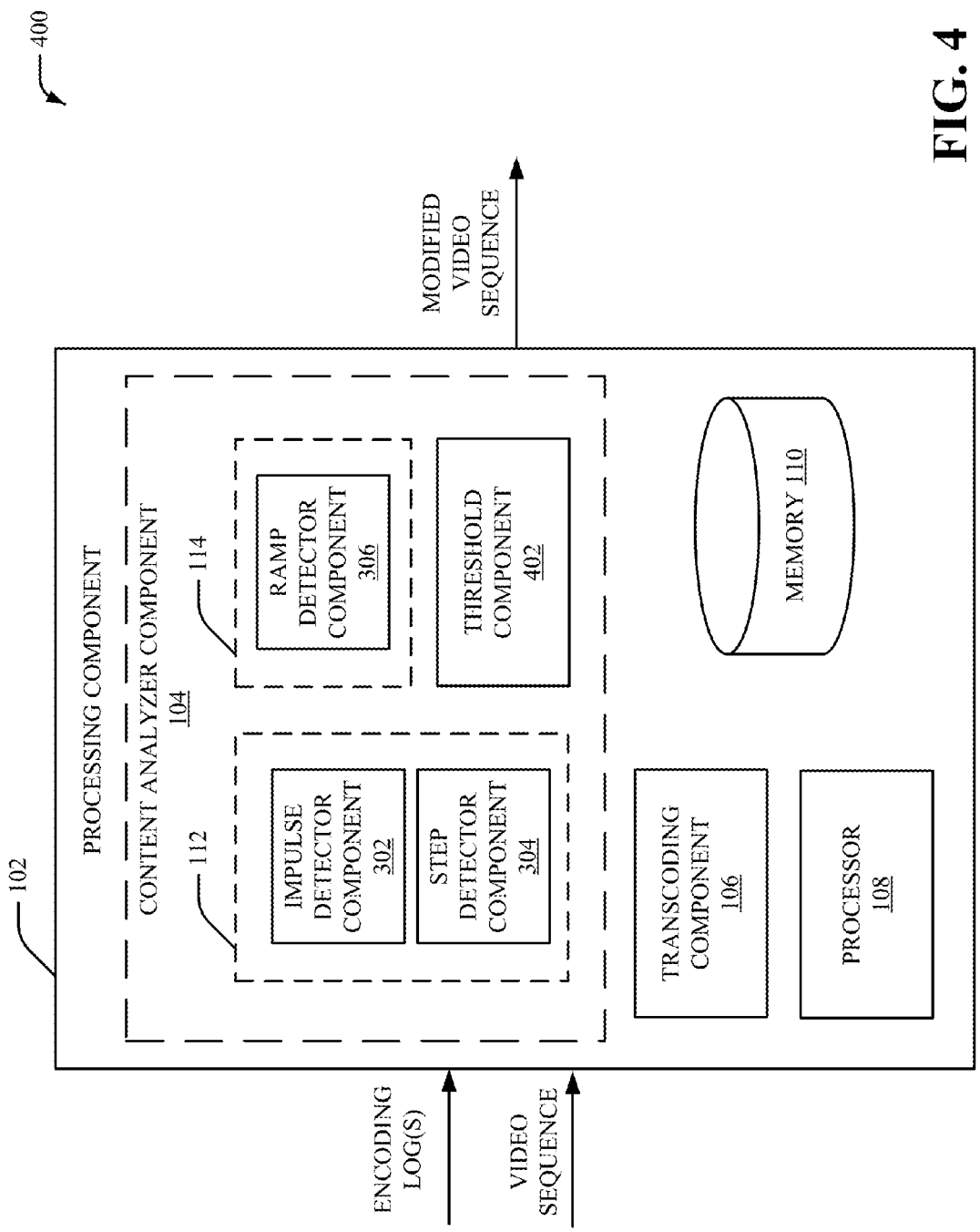
FIG. 4 illustrates a high-level block diagram of yet another example system for analyzing and/or processing video content using at least one encoding log, in accordance with various aspects and implementations described herein.

FIG. 4 illustrates a non-limiting implementation of a system 400 in accordance with various aspects and implementations of this disclosure. The system 400 includes the processing component 102. The processing component 102 includes the content analyzer component 104 and the transcoding component 106. In an aspect, the content analyzer component 104 can be implemented on the processing component 102. In another aspect, the content analyzer component 104 can be implemented separate from the processing component 102 and/or the transcoding component 106. The content analyzer component 104 can include the first analysis component 112, the second analysis component 114 and a threshold component 402. The first analysis component 112 can include the impulse detector component 302 and the step detector component 304. The second analysis component 114 can include the ramp detector component 306.

The threshold component 402 can determine, generate and/or store one or more threshold values associated with the first analysis component 112 and/or the second analysis component 114 (e.g., the impulse detector component 302, the step detector component 304 and/or the ramp detector component 306). In an aspect, the threshold component 402 can determine whether a ratio of a particular motion compensated variance data (e.g., associated with a particular video frame) and a local average of motion compensated variance data (e.g., associated with a video sequence than includes the particular video frame) is greater than a certain threshold value. In another aspect, the threshold component 402 can determine whether a ratio of a particular variance data (e.g., associated with a particular video frame) and a local average of variance data (e.g., associated with a video sequence than includes the particular video frame) is greater than a certain threshold value.

In yet another aspect, the threshold component 402 can determine whether a ratio of a difference value associated with a particular variance data (e.g., associated with a particular video frame) and difference values associated with previous variance data and next variance data (e.g., associated with at least one previous video frame and at least one next video frame with respect to the particular video frame) is greater than a certain threshold value. In yet another aspect, the threshold component 402 can determine whether a ratio of a difference value associated with a particular motion compensated variance data (e.g., associated with a particular video frame) and difference values associated with previous motion compensated variance data and next motion compensated variance data (e.g., associated with at least one previous video frame and at least one next video frame with respect to the particular video frame) is greater than a certain threshold value. In yet another aspect, the threshold component 402 can determine whether a coefficient of determination value is greater than a certain threshold value (e.g., a coefficient of determination threshold value) and a slope value (e.g., an absolute value of a slope) is greater than another certain threshold value (e.g., a slope threshold value).

Figure 5:
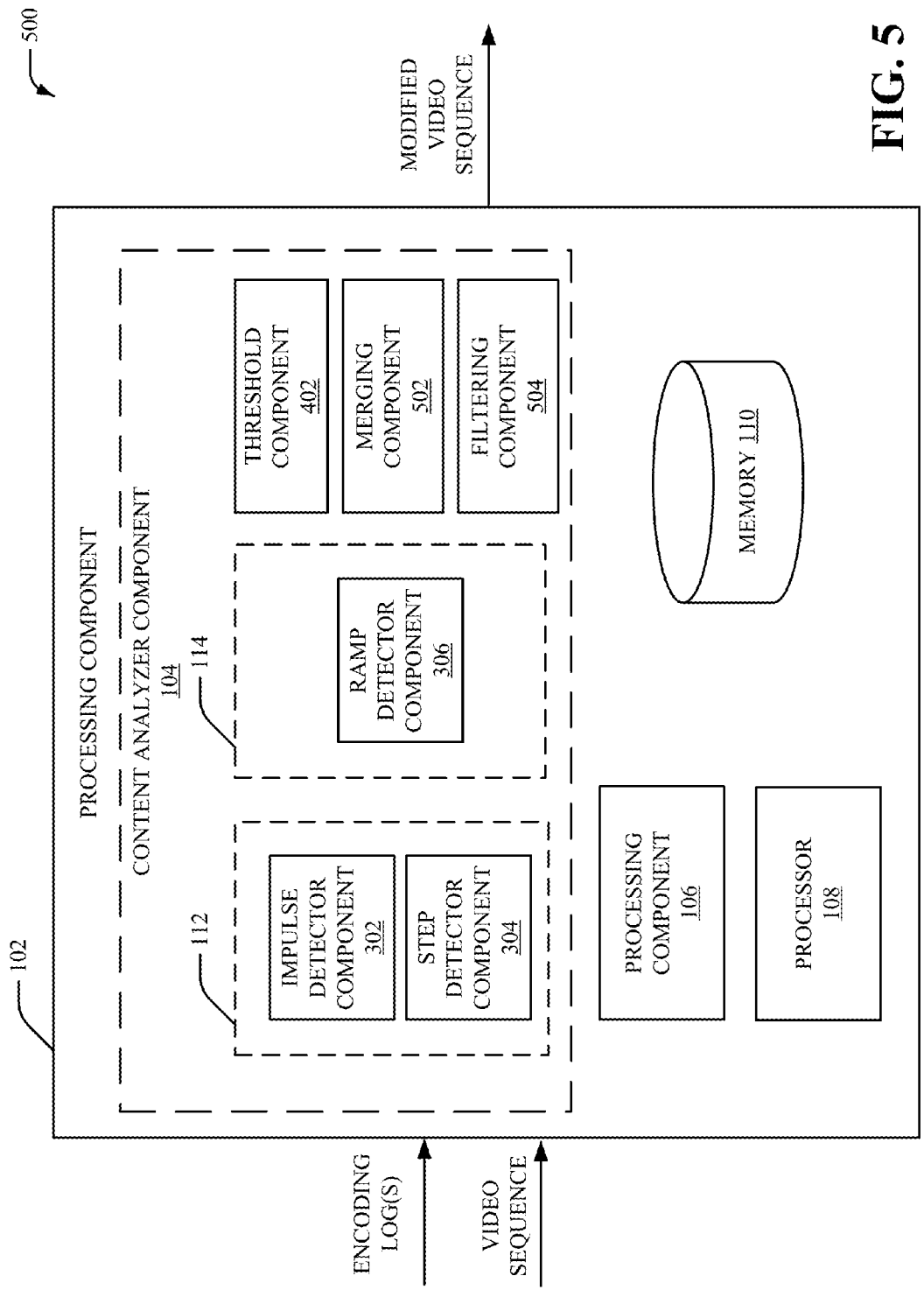
FIG. 5 illustrates a high-level block diagram of yet another example system for analyzing and/or processing video content using at least one encoding log, in accordance with various aspects and implementations described herein.

FIG. 5 illustrates a non-limiting implementation of a system 500 in accordance with various aspects and implementations of this disclosure. The system 500 includes the processing component 102. The processing component 102 includes the content analyzer component 104 and the transcoding component 106. In an aspect, the content analyzer component 104 can be implemented on the processing component 102. In another aspect, the content analyzer component 104 can be implemented separate from the processing component 102 and/or the transcoding component 106. The content analyzer component 104 can include the first analysis component 112, the second analysis component 114, the threshold component 402, a merging component 502 and/or a filtering component 504. The first analysis component 112 can include the impulse detector component 302 and the step detector component 304. The second analysis component 114 can include the ramp detector component 306.

The merging component 502 can merge one or more shot-change locations generated by the first analysis component 112 (e.g., the impulse detector component 302 and/or the step detector component 304) and the second analysis component 114 (e.g., the ramp detector component 306). For example, the merging component 502 can generate a set of potential shot-change locations associated with cut transitions and/or fading transitions. Additionally, the merging component 502 can generate a set of shot-change types (e.g., types of cut transitions, types of fading transitions, etc.) based on the set of potential shot-change locations. For example, shot-change types can include, but is not limited to, regular, fading in start, fading in end, fading out start, fading out end, cross fading start, cross fading end, etc.

The filtering component 504 can filter (e.g., sanitize, remove, etc.) one or more shot-change locations generated by the first analysis component 112 (e.g., the impulse detector component 302 and/or the step detector component 304) and the second analysis component 114 (e.g., the ramp detector component 306). In an aspect, the filtering component 504 can filter (e.g., sanitize) one or more shot-change locations generated by the first analysis component 112 (e.g., the impulse detector component 302 and/or the step detector component 304) and the second analysis component 114 (e.g., the ramp detector component 306) based on data included in the at least one encoding log. In one example, the filtering component 504 can filter (e.g., sanitize) the set of potential shot-change locations to generate a set of finalized shot-change locations. In another example, the filtering component 504 can remove a particular shot-change location associated with a cut transition from the set of shot-change locations in response to a determination that the particular shot-change location associated with a cut transition is located between a pair of shot-change locations associated with a fading transition. In yet another example, the filtering component 504 can remove a particular shot-change location associated with a falsely detected cut transition and/or a falsely detected fading transition from the set of shot-change locations (e.g., the filtering component 504 can remove a shot-change location associated with a minimum fading start location, etc.). However, it is to be appreciated that the filtering component 504 can filter (e.g., sanitize) the set of potential shot-change locations based on different criterion.

In an aspect, the at least one encoding log can include a skip count associated with number of macroblocks that are coded as skip (e.g., associated with a skip indicator) in a video frame. For example, a higher skip count can correspond to a higher number of macroblocks that are copied from a previous video frame. As such, the filtering component 504 can filter (e.g., sanitize) one or more shot-change locations generated by the first analysis component 112 (e.g., the impulse detector component 302 and/or the step detector component 304) and/or the second analysis component 114 (e.g., the ramp detector component 306) based on a skip count (e.g., detection of a false shot-change). Therefore, when a skip ratio of skip count with respect to total macroblocks in a video frame is greater than a certain threshold (and/or an intra count ratio of number of macroblocks associated with intra prediction in a video frame with respect to total macroblocks in a video frame is less than another certain threshold), the filtering component 504 can filter one or more shot-change locations (e.g., disable the impulse detector component 302, the step detector component 304 and/or the ramp detector component 306). However, it is to be appreciated that the filtering component 504 can filter (e.g., sanitize) one or more shot-change locations based on different data stored in the at least one encoding log. In another aspect, the merging component 502 can store a shot-change frame number for each shot-change location in the set of finalized shot-change locations. In another aspect, the merging component 502 can store information associated with the set of potential shot-change locations (e.g., shot-change frame numbers, shot-change types, etc.) in a buffer (e.g., a protocol buffer).

Figure 6:
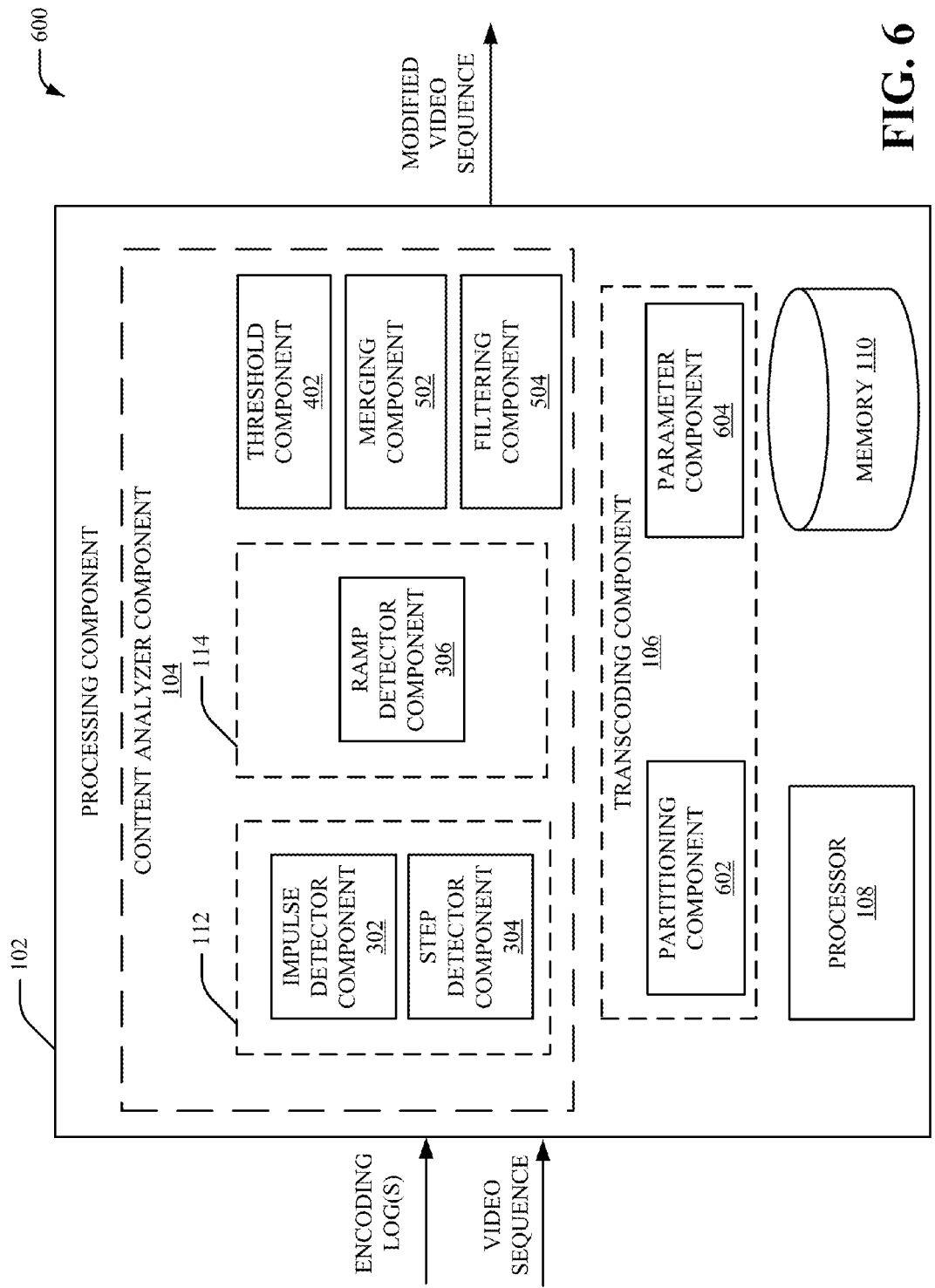
FIG. 6 illustrates a high-level block diagram of yet another example system for analyzing and/or processing video content using at least one encoding log, in accordance with various aspects and implementations described herein.

FIG. 6 illustrates a non-limiting implementation of a system 600 in accordance with various aspects and implementations of this disclosure. The system 600 includes the processing component 102. The processing component 102 includes the content analyzer component 104 and the transcoding component 106. In an aspect, the content analyzer component 104 can be implemented on the processing component 102. In another aspect, the content analyzer component 104 can be implemented separate from the processing component 102 and/or the transcoding component 106. The content analyzer component 104 can include the first analysis component 112, the second analysis component 114, the threshold component 402, the merging component 502 and/or the filtering component 504. In an aspect, the first analysis component 112 can include the impulse detector component 302 and the step detector component 304. In another aspect, the second analysis component 114 can include the ramp detector component 306. The transcoding component 106 includes a partitioning component 602 and/or a parameter component 604.

The partitioning component 602 can partition the video sequence based on at least a portion of the set of shot-change locations associated with a cut transition (e.g., generated by the first analysis component 112) and the second set of shot-change locations associated with a fading transition (e.g., generated by the second analysis component 114). In an aspect, the partitioning component 602 can partition the video sequence into one or more chunks (e.g., to facilitate chunked transcoding) based on at least a portion of the set of shot-change locations associated with a cut transition (e.g., generated by the first analysis component 112) and the second set of shot-change locations associated with a fading transition (e.g., generated by the second analysis component 114). For example, the partitioning component 602 can partition the video sequence based on a set of finalized shot change locations.

Figure 7:
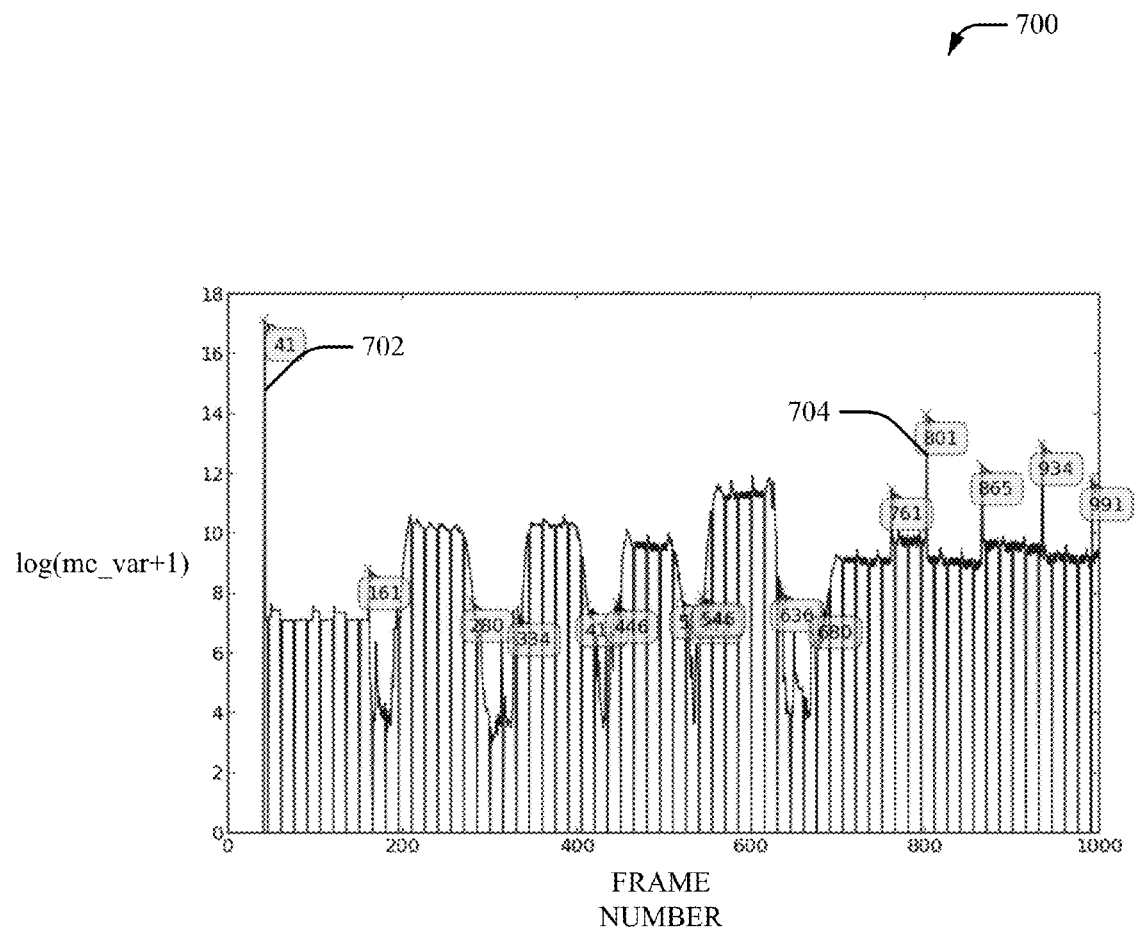
FIG. 7 illustrates statistical data associated with an impulse pattern, in accordance with various aspects and implementations described herein.

The parameter component 604 can modify (e.g., adjust) one or more transcoding parameters based on the first set of shot-change locations and the second set of shot-change locations. In an aspect, the parameter component 604 can select a particular encoding process (e.g., weighted prediction, etc,) based on the first set of shot-change locations and the second set of shot-change locations. Additionally or alternatively, the parameter component 604 can modify (e.g., adjust) one or more other parameters associated with a transcoding process based on the first set of shot-change locations and the second set of shot-change locations. In an aspect, the parameter component 604 can trigger different types of encoding features (e.g., encoding techniques) based on the first set of shot-change locations and the second set of shot-change locations, Referring now to FIG. 7, there is illustrated statistical data associated with an impulse pattern in accordance with various aspects and implementations of this disclosure. Plot 700 illustrates motion compensated variance data (e.g., log(mc_var+1)) represented on the y-axis of plot 700 in terms of frame number (e.g., frame number in a video sequence) represented on the x-axis of plot 700. However, it is to be appreciated that plot 700 can include a different type of statistical data (e.g., variance data). In an aspect, the motion compensated variance data shown in plot 700 can be associated with at least one encoding log, as more fully disclosed herein. The plot 700 illustrates a plurality of impulse patterns (e.g., impulse 702, impulse 704, etc.).

In an example, impulse 702 can correspond to an impulse pattern at frame number 41 and impulse 704 can correspond to an impulse pattern at frame number 801. For example, impulse 702 at frame number 41 can correspond to a motion compensated variance data value that is greater than motion compensated variance data values surrounding (e.g., within a certain range before and after) frame number 41. In an aspect, impulse 702 is determined to be an impulse pattern in response to a determination that a ratio of first statistical data (e.g., motion compensated variance data associated with frame number 41) and second statistical data (e.g., motion compensated variance data associated with at least one frame number prior to frame number 41 and at least one frame number after frame number 41) is greater than a predetermined threshold value. Similarly, impulse 704 at frame number 801 can correspond to a motion compensated variance data value that is greater than motion compensated variance data values surrounding (e.g., within a certain range before and after) frame number 801. In an aspect, impulse 704 is determined to be an impulse pattern in response to a determination that a ratio of first statistical data (e.g., motion compensated variance data associated with frame number 801) and second statistical data (e.g., motion compensated variance data associated with at least one frame number prior to frame number 801 and at least one frame number after frame number 801) is greater than a predetermined threshold value. As such, an impulse pattern can be observed in statistical data due to less temporal dependency between shot-change frames (e.g., discontinuity and/or a sudden change in the statistical data).

Figure 8:
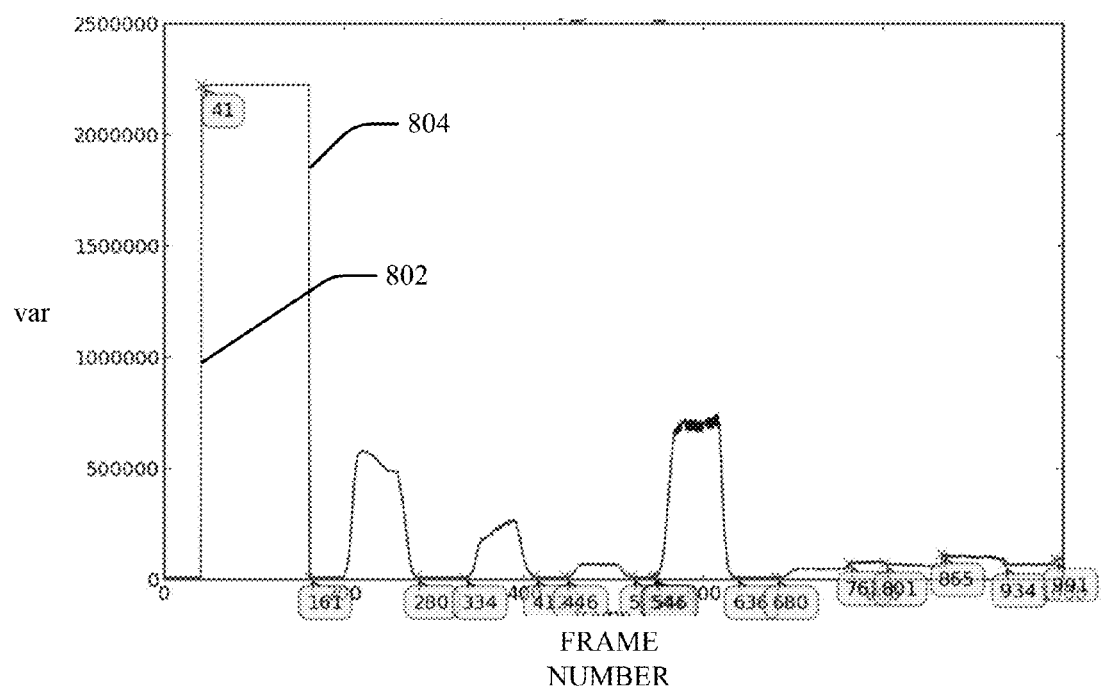
FIG. 8 illustrates statistical data associated with a step pattern, in accordance with various aspects and implementations described herein.

Referring now to FIG. 8, there is illustrated statistical data associated with a step pattern in accordance with various aspects and implementations of this disclosure. Plot 800 illustrates variance data (e.g., var) represented on the y-axis of plot 800 in terms of frame number (e.g., frame number in a video sequence) represented on the x-axis of plot 800. However, it is to be appreciated that plot 800 can include a different type of statistical data (e.g., motion compensated variance data). In an aspect, the variance data shown in plot 800 can be associated with at least one encoding log, as more fully disclosed herein. The plot 800 illustrates a plurality of step patterns (e.g., step 802, step 804, etc.). For example, step 802 can correspond to a step pattern at frame number 41 and step 804 can correspond to a step pattern at frame number 161 (e.g., since there is a discontinuity in the variance data).

Figure 9:
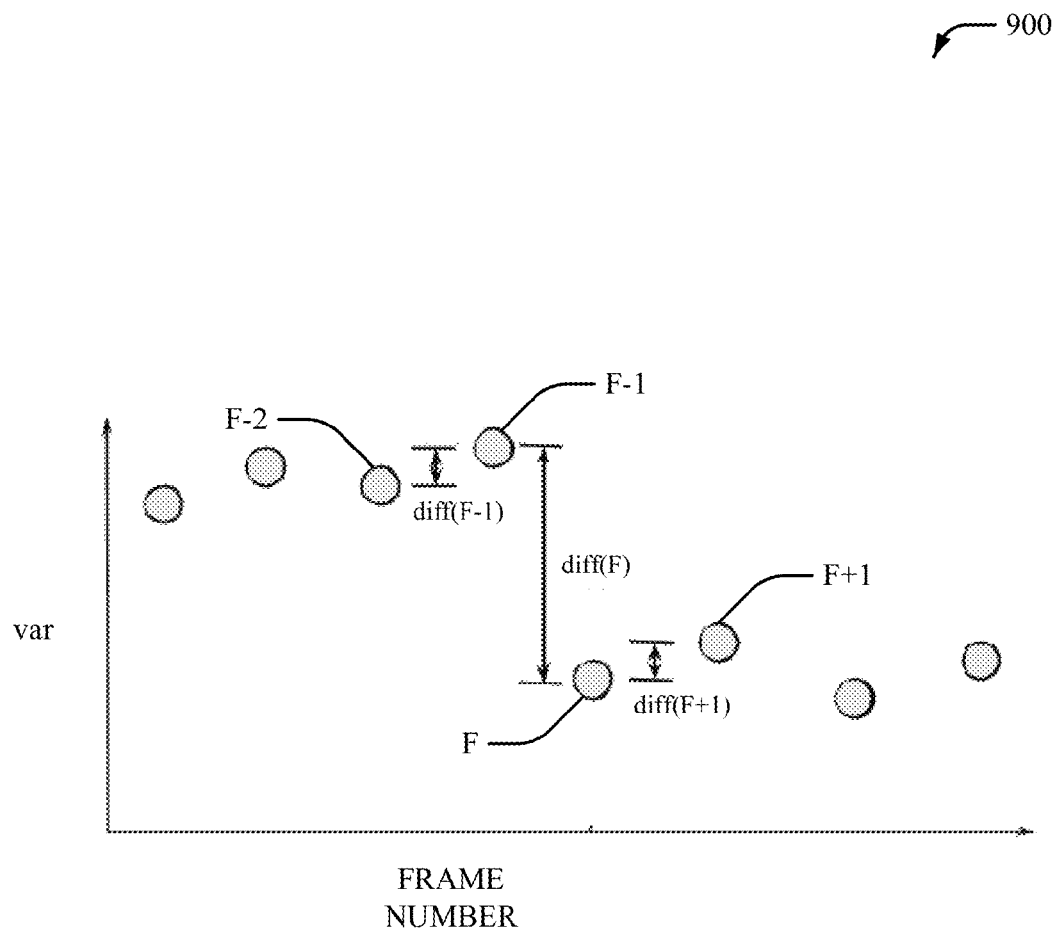
FIG. 9 illustrates detection of a step pattern, in accordance with various aspects and implementations described herein.

Referring now to FIG. 9, there is illustrated detection of a step pattern in accordance with various aspects and implementations of this disclosure. Plot 900 illustrates variance data (e.g., var) represented on the y-axis of plot 900 in terms of frame number (e.g., frame number in a video sequence) represented on the x-axis of plot 900. However, it is to be appreciated that plot 900 can include a different type of statistical data (e.g., motion compensated variance data). In an aspect, the variance data shown in plot 900 can be associated with at least one encoding log, as more fully disclosed herein.

Frame number F can correspond to a current frame (e.g., a current frame being analyzed). Frame number F+1 can correspond to a next frame. Frame number F−1 can correspond to a previous frame. Frame number F−2 can correspond to another previous frame. Difference diff(F) can correspond to a difference between frame number F and frame number F−1. Difference diff(F+1) can correspond to a difference between frame number F and frame number F+1. Difference diff(F−1) can correspond to a difference between frame number F−1 and frame number F−2. In an aspect, a step can be a data sample (e.g., corresponding to frame F) at which a difference to a previous sample (e.g., corresponding to frame F−1) denoted as diff(F) is greater than diff(F−1) and diff(F+1), where diff(F)=|var(F)−var(F−1)|. In one example, if a ratio diff(F)/[diff(F−1)+diff(F+1)+1] is greater than a certain threshold, then frame number F can correspond to a step pattern.

Figure 10:
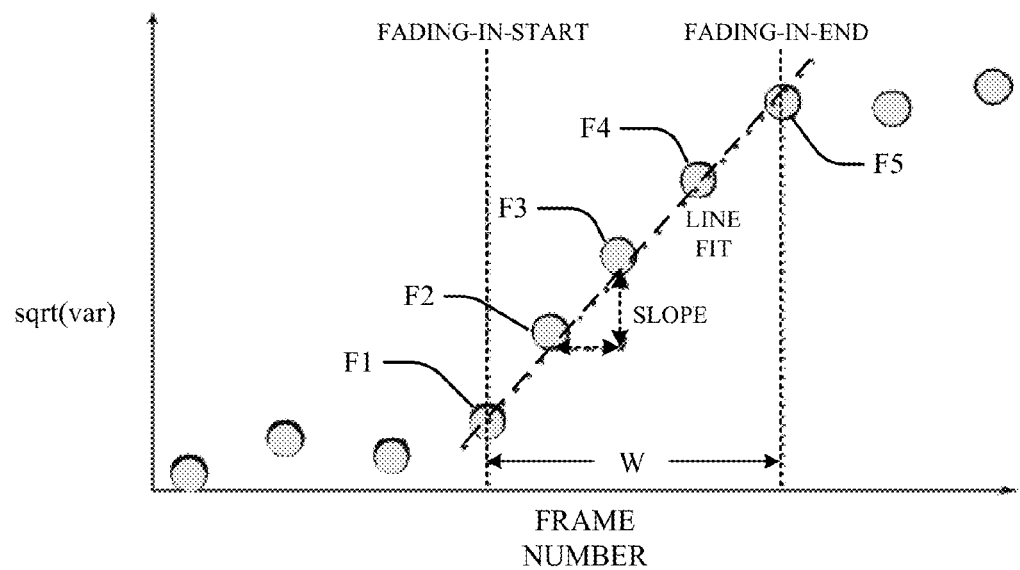
FIG. 10 illustrates detection of a ramp pattern, in accordance with various aspects and implementations described herein.

Referring now to FIG. 10, there is illustrated detection of a ramp pattern in accordance with various aspects and implementations of this disclosure. Plot 1000 illustrates variance data (e.g., sqrt(var)) represented on the y-axis of plot 1000 in terms of frame number (e.g., frame number in a video sequence) represented on the x-axis of plot 1000. However, it is to be appreciated that plot 1000 can include a different type of statistical data (e.g., motion compensated variance data). In an aspect, the variance data included in plot 1000 can be associated with at least one encoding log, as more fully disclosed herein. Frame numbers F1-F5 can correspond to a set of data sample values (e.g., a sequence of data sample values) included in the variance data (e.g., var data).

In an aspect, it can be determined whether a sequence of sqrt(var(W)) associated with window W is gradually decreasing or increasing. Furthermore, linear regression can be employed to fit the sequence of sqrt(var(W)) against a sequence from frame numbers F1-F5. Additionally, at least one slope value (e.g., at least one absolute value of slope) associated with frame numbers F1-F5 can be determined (e.g. a slope value can be determined based on the frame number F2 and the frame number F3, etc.). Additionally, a coefficient of determination value associated with frame numbers F1-F5 can be determined based on the line fit (e.g., linear fitting). In an aspect, a ramp pattern can be identified in response to a determination that the coefficient of determination value associated with the frame numbers F1-F5 is greater than a certain threshold and the at least one slope value (e.g., the at least one absolute value of slope) associated with the frame numbers F1-F5 is greater than another certain threshold. A fading start can correspond to a start of a sliding window W and a fading end can correspond to an end of the sliding window W. In an aspect, a fading start can trigger a fading state and fading end can trigger a normal state. In another aspect, a ramp can correspond to fading-in or fading-out based on a slope value. For example, a positive slope value can correspond to a ramp that is increasing and a negative slope value can correspond to a ramp that is decreasing. Therefore a ramp pattern (e.g., a fading pattern) can be detected by determining an absolute value of a slope. Furthermore, a type of ramp (e.g., a fading-in ramp or a fading-out ramp) can be determined by a sign (e.g., a positive value or a negative value) associated with the slope. As such, a ramp corresponding to frame numbers F1-F5 can correspond to a fading-in ramp. Furthermore, frame number F1 can correspond to a fading-in start and frame number F5 can correspond to a fading-in end.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

FIGS. 11-14 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device or storage media.

Figure 11:
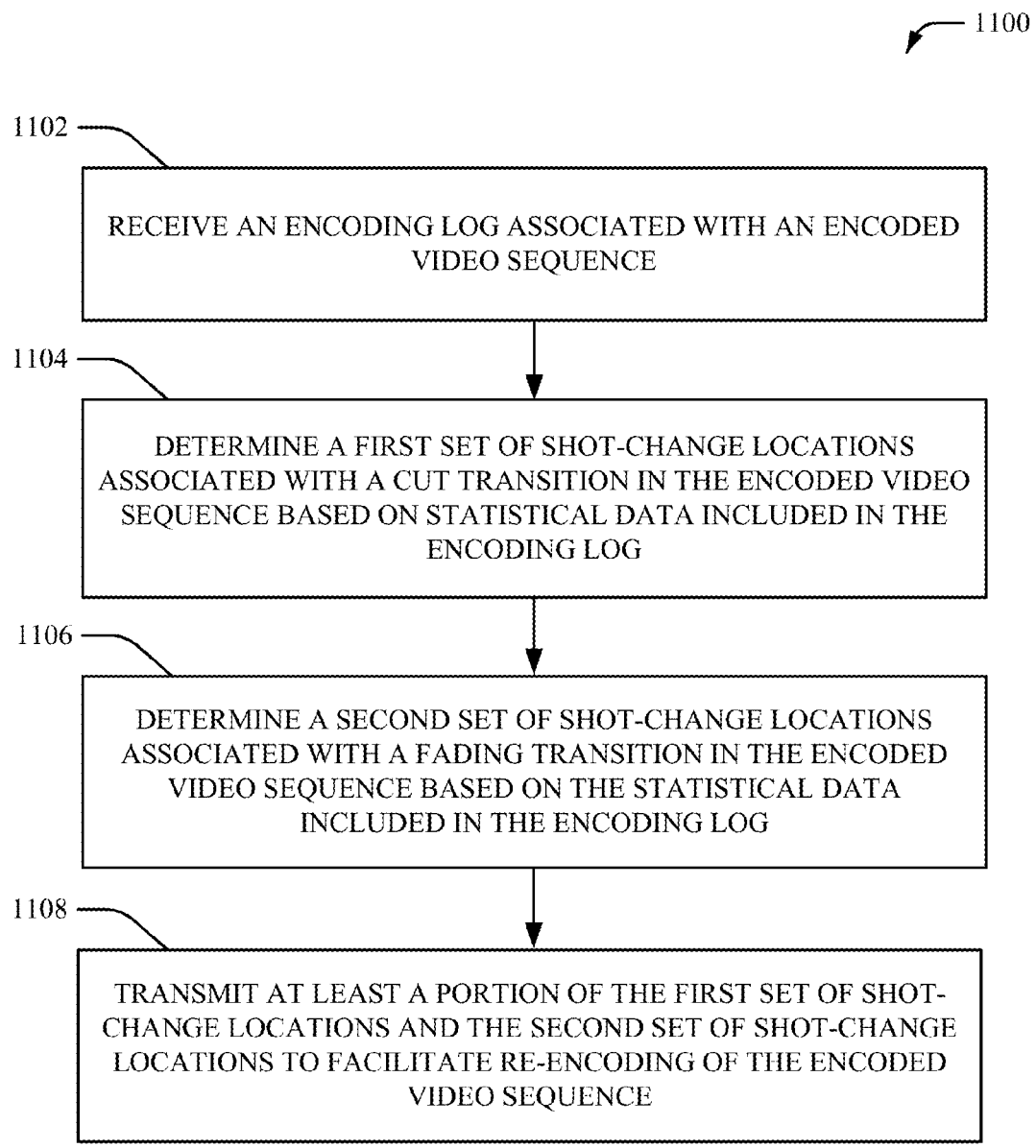
FIG. 11 depicts a flow diagram of an example method for determining one or more shot-change locations, in accordance with various aspects and implementations described herein.

Referring to FIG. 11, there illustrated is a methodology 1100 for determining one or more shot-change locations, according to an aspect of the subject innovation. As an example, the methodology can be implemented on or in connection with one or more servers (e.g., one or more servers that host user-uploaded media content, one or more servers associated with streaming media content, etc.). For example, the methodology 1100 can be utilized in various applications, such as, but not limited to, media content systems, media server systems, cloud-based systems, content management systems, network systems, computer network systems, communication systems, router systems, server systems, high availability server systems (e.g., Telecom server systems), Web server systems, file server systems, disk array systems, powered insertion board systems, etc. As another example, methodology 1100 can be utilized in connection with a device (e.g., a user device) such as, but is not limited to, a cellular phone (e.g., a smartphone), a tablet, a camera, a personal computer (PC), a desktop computer, a laptop computer, a personal digital assistant (PDA), an electronic reader (e-reader), a media capable device, a portable computing device, an interactive television, an internet-connected television, a set-top box, a streaming media device, a gaming device, etc.

At 1102, an encoding log associated with an encoded video sequence is received (e.g., by a content analyzer component 104). In an aspect, the encoded video sequence can be an encoded video sequence (e.g., a previously encoded video sequence, a compressed video sequence, etc.) associated with (e.g., generated by) a first transcoding process. In an aspect, the at least one encoding log can be a video compression standard log. In a non-limiting example, the at least one encoding log can be implemented as at least on H.263 log. However, it is to be appreciated that the at least one encoding log can be a different type of video compression standard log (e.g., H.264, VP8, MPEG-4 Visual, AVC, etc.).

At 1104, a first set of shot-change locations associated with a cut transition in the encoded video sequence is determined (e.g., by a first analysis component 112) based on statistical data included in the encoding log. For example, a first set of shot-change locations associated with a cut transition in the encoded video sequence can be determined based on variance data (e.g., var data) and/or the motion compensated variance data (e.g., mc_var data) included in the encoding log. In an aspect, the variance data can be sum of block variance data associated with video frames in the encoded video sequence. In another aspect, the motion compensated variance data can be sum of motion compensated block variance associated with residual frames related to the encoded video sequence. In an aspect, the first set of shot-change location can correspond to a data sample (e.g., a frame number) associated with a discontinuity (e.g., a sudden change) in the variance data (e.g., var data) and/or the motion compensated variance data (e.g., mc_var data). In another aspect, an impulse detector and/or a step detector can be implemented to analyze (e.g., detect a discontinuity in) the statistical data (e.g., the var data and/or the mc_var data).

At 1106, a second set of shot-change locations associated with a fading transition in the encoded video sequence is determined (e.g., by a second analysis component 114) based on the statistical data included in the encoding log. For example, a second set of shot-change locations associated with a fading transition in the encoded video sequence can be determined based on the variance data (e.g., var data) included in the encoding log. In an aspect, the second set of shot-change location can correspond to a data sample (e.g., a frame number) associated with a gradual change in the variance data (e.g., var data). In an aspect, a ramp detector can be implemented to analyze (e.g., detect a gradual change in) the statistical data (e.g., the var data).

At 1108, at least a portion of the first set of shot-change locations and the second set of shot-change locations is transmitted (e.g., by a content analyzer component 104) to facilitate re-encoding of the encoded video sequence. For example, the first set of shot-change locations and the second set of shot-change locations can be combined and/or filtered to generate a set of finalized shot-change locations. The set of finalized shot-change locations can be transmitted, for example, to a transcoder (e.g., a transcoding component) that can re-encode the encoded video sequence based on the set of finalized shot-change locations.

Figure 12:
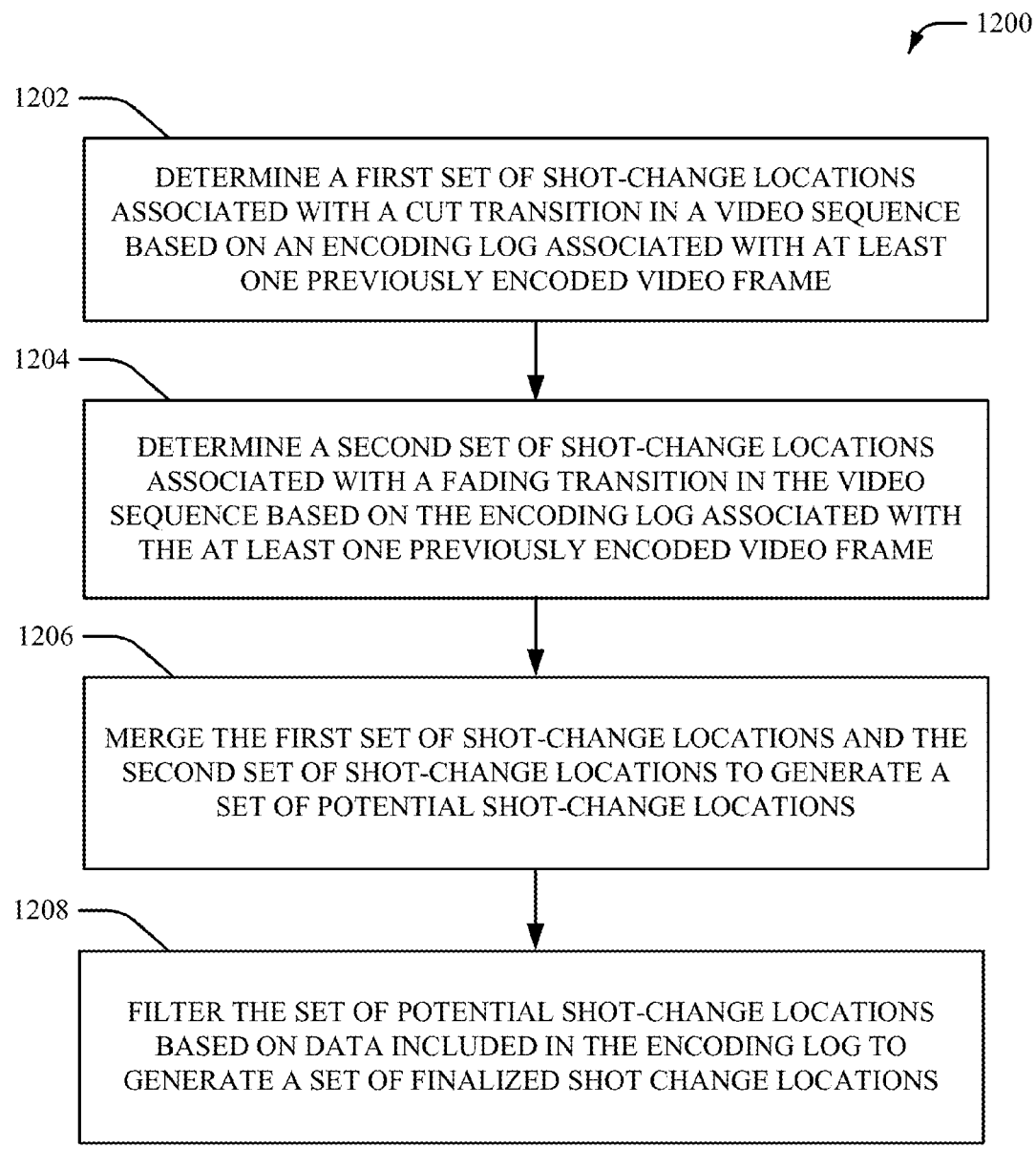
FIG. 12 depicts a flow diagram of another example method for determining one or more shot-change locations, in accordance with various aspects and implementations described herein.

Referring to FIG. 12, there illustrated is an example methodology 1200 for determining one or more shot-change locations, according to another aspect of the subject innovation. At 1202, a first set of shot-change locations associated with a cut transition in a video sequence is determined (e.g., by a first analysis component 112) based on an encoding log associated with at least one previously encoded video frame. For example, a first set of shot-change locations associated with a cut transition in a video sequence can be determined based on statistical data (e.g., variance data associated with video frames in the video sequence and/or motion compensated variance data associated with residual frames related to the video sequence) included in the encoding log.

At 1204, a second set of shot-change locations associated with a fading transition in the video sequence is determined (e.g., by a second analysis component 114) based on the encoding log associated with the at least one previously encoded video frame. For example, a second set of shot-change locations associated with a fading transition in a video sequence can be determined based on statistical data (e.g., variance data associated with video frames in the video sequence) included in the encoding log.

At 1206, the first set of shot-change locations and the second set of shot-change locations are merged (e.g., by a merging component 502) to generate a set of potential shot-change locations. For example, the first set of shot-change locations and the second set of shot-change locations can be combined into a single set of potential shot-change locations. In an aspect, the set of potential shot-change locations can be associated with a set of shot-change types (e.g., types of cut transitions, types of fading transitions, etc.).

At 1208, the set of potential shot-change locations are filtered (e.g., by a filtering component 504) based on data included in the encoding log to generate a set of finalized shot change locations. In an example, a particular shot-change location associated with a cut transition can be removed from the set of shot-change locations in response to a determination that the particular shot-change location associated with a cut transition is located between a pair of shot-change locations associated with a fading transition. In another example, a particular shot-change location associated with a falsely detected cut transition and/or a falsely detected fading transition can be removed from the set of shot-change locations.

Figure 13:
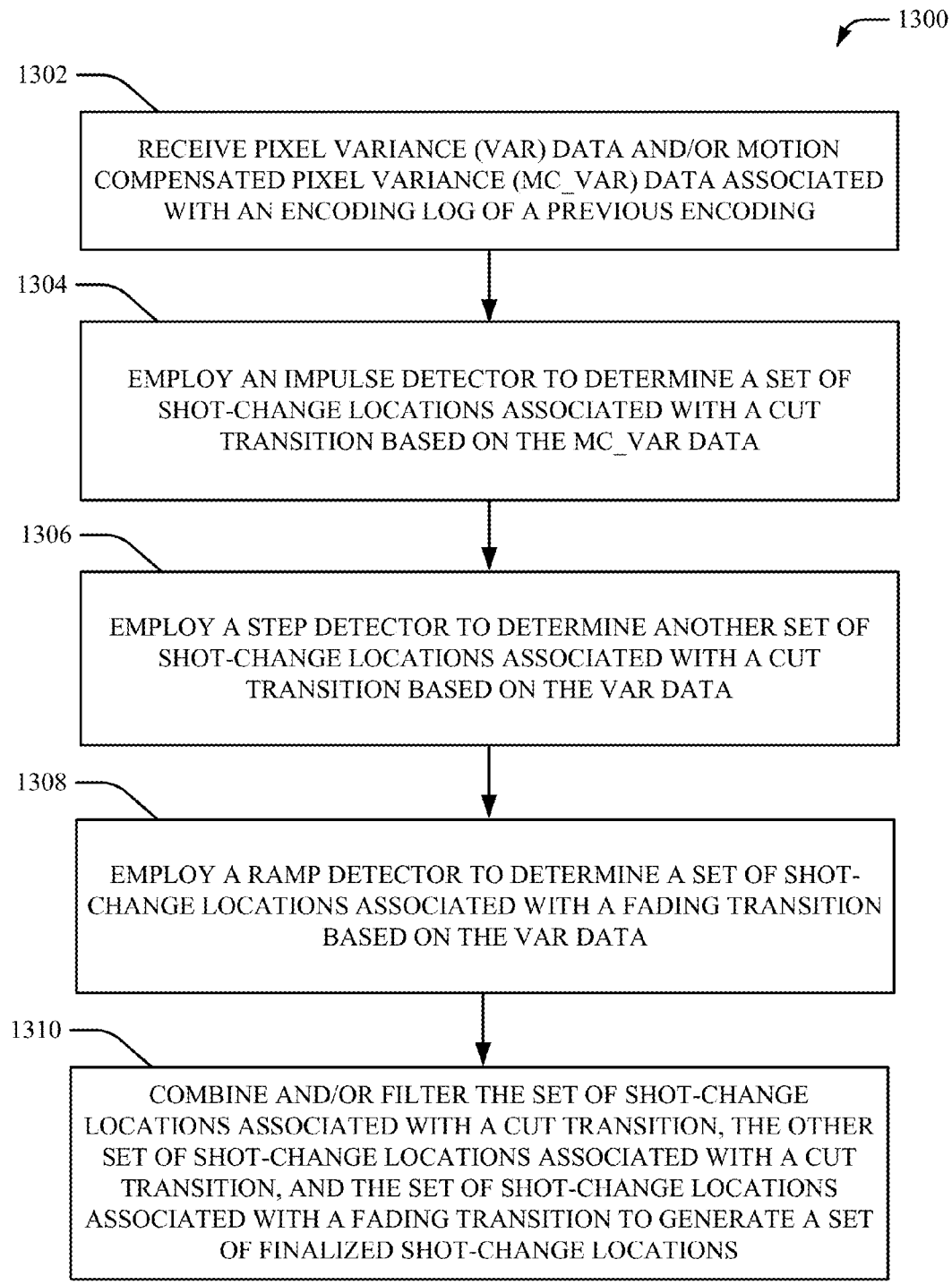
FIG. 13 depicts a flow diagram of yet another example method for determining one or more shot-change locations, in accordance with various aspects and implementations described herein.

Referring to FIG. 13, there illustrated is an example methodology 1300 for determining one or more shot-change locations, according to yet another aspect of the subject innovation. At 1302, pixel variance (var) data and/or motion compensated pixel variance (mc_var) data associated with an encoding log of a previous encoding is received (e.g., by a content analyzer component 104). For example, var data and/or mc_var data can be included in an encoding log associated with an encoded video sequence.

At 1304, an impulse detector is employed (e.g., by a first analysis component 112) to determine a set of shot-change locations associated with a cut transition based on the mc_var data. For example, an impulse detector can detect an impulse pattern in the mc_var data and/or associate the impulse pattern with a shot-change location related to a cut transition. Additionally or alternatively, an impulse detector can be employed to determine a set of shot-change locations associated with a cut transition based on the var data. For example, an impulse detector can additionally or alternatively detect an impulse pattern in the var data and/or associate the impulse pattern with a shot-change location related to a cut transition.

At 1306, a step detector is employed (e.g., by a first analysis component 112) to determine another set of shot-change locations associated with a cut transition based on the var data. For example, a step detector can detect a step pattern in the var data and/or associate the step pattern with a shot-change location related to a cut transition. Additionally or alternatively, a step detector can be employed to determine a set of shot-change locations associated with a cut transition based on the mc_var data. For example, a step detector can detect a step pattern in the mc_var data and/or associate the step pattern with a shot-change location related to a cut transition.

At 1308, a ramp detector is employed (e.g., by a second analysis component 114) to determine a set of shot-change locations associated with a fading transition based on the var data. For example, a ramp detector can detect a ramp pattern in the var data and/or associate the ramp pattern with a shot-change location related to a fading transition.

At 1310, the set of shot-change locations associated with a cut transition, the other set of shot-change locations associated with a cut transition, and the set of shot-change locations associated with a fading transition are combined and/or filtered (e.g., by a merging component 502 and/or a filtering component 504) to generate a set of finalized shot-change locations.

Figure 14:
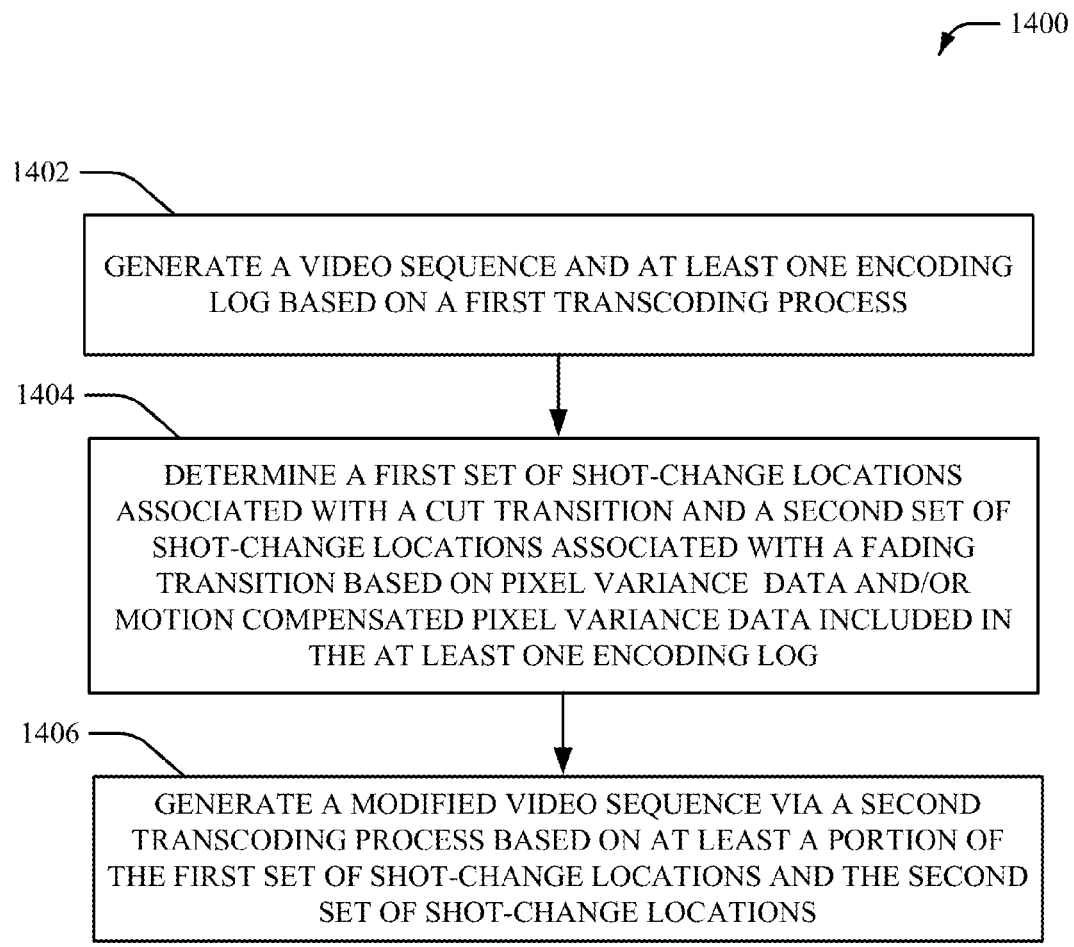
FIG. 14 depicts a flow diagram of an example method for analyzing and/or processing video content using at least one encoding log, in accordance with various aspects and implementations described herein.

Referring to FIG. 14, there illustrated is an example methodology 1400 for analyzing and/or processing video content using at least one encoding log, according to an aspect of the subject innovation. At 1402, a video sequence and at least one encoding log is generated (e.g., by a first transcoding component 206) based on a first transcoding process. For example, the video sequence can be in a mezzanine format (e.g., an intermediate encoding format). However, it is to be appreciated that the video sequence can be in any recognizable and suitable media file format (e.g., video file format, codec compression format, video encoding format, trancoding format, etc.). In an aspect, the at least one encoding log can be associated with the video sequence. As such, the at least one encoding log can be associated with at least one previously encoded video frame (e.g., a previously encoded video sequence, a video sequence generated via a first transcoding process, etc.). In another aspect, the at least one encoding log can be associated with a video compression standard.

At 1404, a first set of shot-change locations associated with a cut transition and a second set of shot-change locations associated with a fading transition are determined (e.g., by a content analyzer component 104) based on pixel variance data and/or motion compensated variance data included in the at least one encoding log. For example, an impulse detector, a step detector and/or a ramp detector can analyze (e.g., determine changes in) the pixel variance data and/or motion compensated variance data included in the at least one encoding log to determine the first set of shot-change locations associated with a cut transition and/or the second set of shot-change locations associated with a fading transition.

At 1406, a modified video sequence is generated (e.g., by a second transcoding component 208) via a second transcoding process based on at least a portion of the first set of shot-change locations and the second set of shot-change locations. For example, the video sequence can be transcoded into the modified video sequence via a second transcoding process based on at least a portion of the first set of shot-change locations and the second set of shot-change locations. In an aspect, the modified video sequence can be in a target format (e.g., a finalized format). It is to be appreciated that the target format (e.g., finalized format) can be any recognizable and/or suitable media file format (e.g., H.263, H.264, VP8, MPEG-4 Visual, AVC, etc.).

Figure 15:
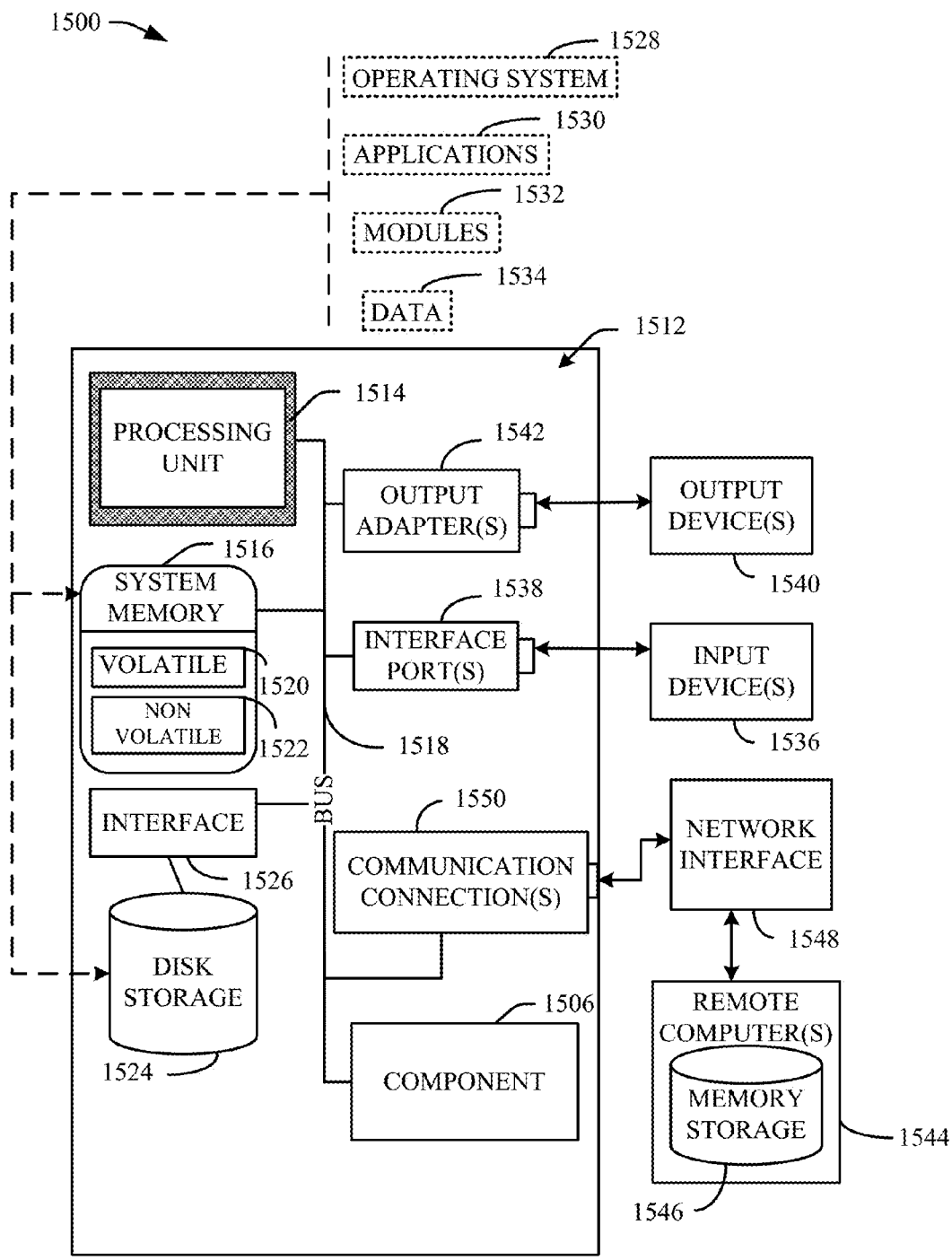
FIG. 15 is a schematic block diagram illustrating a suitable operating environment.
Figure 16:
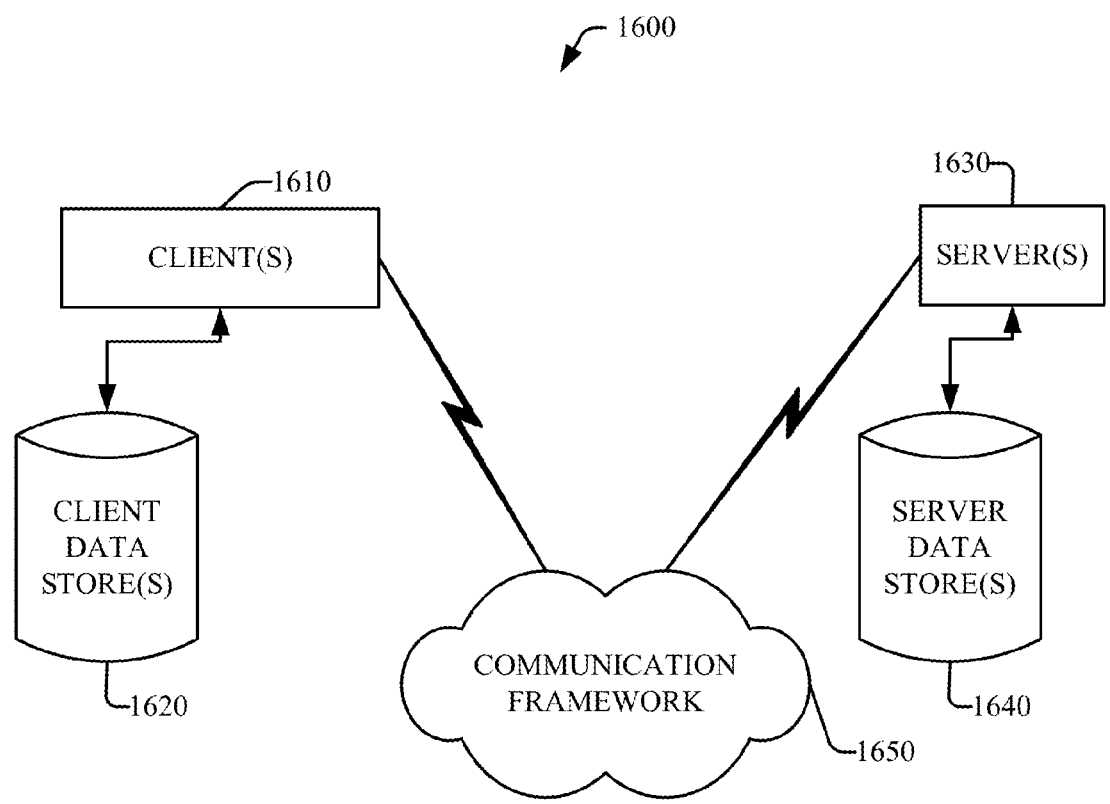
FIG. 16 is a schematic block diagram of a sample-computing environment.

In order to provide a context for the various aspects of the disclosed subject matter, FIGS. 15 and 16 as well as the following discussion are intended to provide a brief, general description of a suitable environment in which the various aspects of the disclosed subject matter may be implemented.

With reference to FIG. 15, a suitable environment 1500 for implementing various aspects of this disclosure includes a computer 1512. The computer 1512 includes a processing unit 1514, a system memory 1516, and a system bus 1518. The system bus 1518 couples system components including, but not limited to, the system memory 1516 to the processing unit 1514. The processing unit 1514 can be any of various available processors. Dual microprocessors and other multiprocessor architectures also can be employed as the processing unit 1514.

The system bus 1518 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1516 includes volatile memory 1520 and nonvolatile memory 1522. The basic input/output system (BIOS), containing the basic routines to transfer information between elements within the computer 1512, such as during start-up, is stored in nonvolatile memory 1522. By way of illustration, and not limitation, nonvolatile memory 1522 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1520 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1512 also includes removable/non-removable, volatile/non-volatile computer storage media. FIG. 15 illustrates, for example, a disk storage 1524. Disk storage 1524 includes, but is not limited to, devices like a magnetic disk drive, floppy disk drive, tape drive, Jaz drive, Zip drive, LS-100 drive, flash memory card, or memory stick. The disk storage 1524 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1524 to the system bus 1518, a removable or non-removable interface is typically used, such as interface 1526.

FIG. 15 also depicts software that acts as an intermediary between users and the basic computer resources described in the suitable operating environment 1500. Such software includes, for example, an operating system 1528. Operating system 1528, which can be stored on disk storage 1524, acts to control and allocate resources of the computer system 1512. System applications 1530 take advantage of the management of resources by operating system 1528 through program modules 1532 and program data 1534, e.g., stored either in system memory 1516 or on disk storage 1524. It is to be appreciated that this disclosure can be implemented with various operating systems or combinations of operating systems.

A user enters commands or information into the computer 1512 through input device(s) 1536. Input devices 1536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1514 through the system bus 1518 via interface port(s) 1538. Interface port(s) 1538 include, for example, a serial port, a parallel port, a game port, and a universal serial bus (USB). Output device(s) 1540 use some of the same type of ports as input device(s) 1536. Thus, for example, a USB port may be used to provide input to computer 1512, and to output information from computer 1512 to an output device 1540. Output adapter 1542 is provided to illustrate that there are some output devices 1540 like monitors, speakers, and printers, among other output devices 1540, which require special adapters. The output adapters 1542 include, by way of illustration and not limitation, video and sound cards that provide a means of connection between the output device 1540 and the system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. The remote computer(s) 1544 can be a personal computer, a server, a router, a network PC, a workstation, a microprocessor based appliance, a peer device or other common network node and the like, and typically includes many or all of the elements described relative to computer 1512. For purposes of brevity, only a memory storage device 1546 is illustrated with remote computer(s) 1544. Remote computer(s) 1544 is logically connected to computer 1512 through a network interface 1548 and then physically connected via communication connection 1550. Network interface 1548 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1550 refers to the hardware/software employed to connect the network interface 1548 to the bus 1518. While communication connection 1550 is shown for illustrative clarity inside computer 1512, it can also be external to computer 1512. The hardware/software necessary for connection to the network interface 1548 includes, for exemplary purposes only, internal and external technologies such as, modems including regular telephone grade modems, cable modems and DSL modems, ISDN adapters, and Ethernet cards.

It is to be appreciated that the computer 1512 can be used in connection with implementing one or more of the systems or components shown and described in connection with FIGS. 1-6. In accordance with various aspects and implementations, the computer 1512 can be used to facilitate media content protection. In certain exemplary embodiments, the computer 1512 includes a component 1506 (e.g., processing component 102, content analyzer component 104, transcoder component 202, etc.) that can contain, for example, a first analysis component, a second analysis component, a transcoding component, a first transcoding component, a second transcoding component, an impulse detector component, a step detector component, a ramp detector component, a threshold component, a merging component, a filtering component, a partitioning component and/or a parameter component, each of which can respectively function as more fully disclosed herein.

FIG. 16 is a schematic block diagram of a sample-computing environment 1600 with which the subject matter of this disclosure can interact. The system 1600 includes one or more client(s) 1610. The client(s) 1610 can be hardware and/or software (e.g., threads, processes, computing devices). The system 1600 also includes one or more server(s) 1630. Thus, system 1600 can correspond to a two-tier client server model or a multi-tier model (e.g., client, middle tier server, data server), amongst other models. The server(s) 1630 can also be hardware and/or software (e.g., threads, processes, computing devices). The servers 1630 can house threads to perform transformations by employing this disclosure, for example. One possible communication between a client 1610 and a server 1630 may be in the form of a data packet transmitted between two or more computer processes.

The system 1600 includes a communication framework 1650 that can be employed to facilitate communications between the client(s) 1610 and the server(s) 1630. The client(s) 1610 are operatively connected to one or more client data store(s) 1620 that can be employed to store information local to the client(s) 1610. Similarly, the server(s) 1630 are operatively connected to one or more server data store(s) 1640 that can be employed to store information local to the servers 1630.

It is to be noted that aspects or features of this disclosure can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

It is to be appreciated and understood that components (e.g., processing component, content analyzer component, transcoder component, first analysis component, second analysis component, transcoding component, first transcoding component, second transcoding component, impulse detector component, step detector component, ramp detector component, threshold component, merging component, filtering component, partitioning component and/or parameter component, etc.), as described with regard to a particular system or method, can include the same or similar functionality as respective components (e.g., respectively named components or similarly named components) as described with regard to other systems or methods disclosed herein.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
   a memory storing computer executable components; and
   a processor configured to execute the computer executable components stored in the memory to perform steps comprising:
      receiving an encoding log associated with an encoded video sequence, the encoding log including statistical data associated with the encoded video sequence;
      determining a first set of shot-change locations associated with a cut transition in the encoded video sequence based on an analysis of changes in the statistical data in the encoding log;
      determining a second set of shot-change locations associated with a fading transition in the encoded video sequence based on the analysis of changes in the statistical data in the encoding log;
      filtering the first set of shot-change locations and the second set of shot-change locations to generate a set of finalized shot-change locations, the filtering comprising removing a shot-change location from the first set based on a sequential relationship between the shot-change location and shot-change locations in the second set; and
      processing the encoded video sequence based on at least a portion of the set of finalized shot-change locations.

2. The system of claim 1, wherein determining the first set of shot-change locations associated with the cut transition is based on motion compensated pixel variance data or pixel variance data included in the encoding log.

3. The system of claim 2, wherein determining the first set of shot-change locations comprises detecting at least one data sample associated with a discontinuity in the motion compensated pixel variance data.

4. The system of claim 2, wherein determining the first set of shot-change locations comprises detecting at least one data sample associated with a discontinuity in the pixel variance data.

5. The system of claim 1, wherein the analysis for determining the second set of shot-change locations further comprises determining a level of variance associated with the statistical data.

6. The system of claim 1, the steps further comprising merging the filtered first set of shot-change locations and the filtered second set of shot-change locations to generate a set of potential shot-change locations.

7. The system of claim 6, further comprising filtering the set of potential shot-change locations based on other data included in the encoding log to generate the set of finalized shot change locations.

8. The system of claim 1, wherein the encoding log is generated by a different transcoding component.

9. The system of claim 1, wherein the first and second sets of shot-change locations are determined without processing pixel data related to video frames in the encoded video sequence and without processing a bitstream associated with the encoded video sequence.

10. A method, comprising:
    employing a processor that facilitates execution of computer executable instructions stored on a non-transitory computer readable medium to implement operations, comprising:
       receiving an encoding log associated with an encoded video sequence, the encoding log including statistical data associated with the encoded video sequence;
       determining a first set of shot-change locations associated with a cut transition in the encoded video sequence based on an analysis of changes in the statistical data in the encoding log;
       determining a second set of shot-change locations associated with a fading transition in the encoded video sequence based on the analysis of changes in the statistical data in the encoding log;
       filtering the first set of shot-change locations and the second set of shot-change locations to generate a set of finalized shot-change locations, the filtering comprising removing a shot-change location from the first set based on a sequential relationship between the shot-change location and shot-change locations in the second set; and
       transmitting at least a portion of the finalized shot-change locations to facilitate re-encoding of the encoded video sequence.

11. The method of claim 10, wherein the determining the first set of shot-change locations includes determining the first set of shot-change locations associated with the cut transition based on motion compensated pixel variance data or pixel variance data included in the encoding log.

12. The method of claim 11, wherein the determining the first set of shot-change locations further includes detecting at least one data sample associated with a discontinuity in the motion compensated pixel variance data.

13. The method of claim 11, wherein the determining the first set of shot-change locations further includes detecting at least one data sample associated with a discontinuity in the pixel variance data.

14. The method of claim 10, wherein the analysis for determining the second set of shot-change locations further comprises determining a level of variance associated with the statistical data.

15. The method of claim 10, further comprising:
    combining the filtered first set of shot-change locations and the filtered second set of shot-change locations to generate a set of potential shot-change locations; and
    filtering the set of potential shot-change locations based on other data included in the encoding log to generate the set of finalized shot change locations.

16. A system, comprising:

a memory storing computer executable components; and a processor configured to execute the computer executable components stored in the memory to perform steps comprising:

generating an encoded video sequence and at least one encoding log associated with the encoded video sequence, the encoding log including statistical data associated with the encoded video sequence;

determining a first set of shot-change locations associated with a cut transition and a second set of shot-change locations associated with a fading transition based on an analysis of changes in the statistical data in the at least one encoding log associated with the encoded video sequence;

filtering the first set of shot-change locations and the second set of shot-change locations to generate a set of finalized shot-change locations, the filtering comprising removing a shot-change location from the first set based on a sequential relationship between the shot-change location and shot-change locations in the second set.

\* \* \* \* \*